US011161686B2

(12) United States Patent
Press et al.

(10) Patent No.: US 11,161,686 B2
(45) Date of Patent: Nov. 2, 2021

(54) COLLAPSIBLE INTERMODAL CONTAINER AND A COLLAPSIBLE INTERMODAL CONTAINER ASSEMBLY

(71) Applicant: CEC Systems Pty Ltd, Sydney (AU)

(72) Inventors: Nicholas Oliver Press, Woollahra (AU); Robert Bruce Tiller, Rozelle (AU); Stephen Richard Hill, Rozelle (AU); Daniel Graham Salmon, Waterloo (AU); Lior Hershkovitz, Vaucluse (AU)

(73) Assignee: Spectainer Pty Limited, Sydney (AU)

( * ) Notice: Subject to any disclaimer, the term of this patent is extended or adjusted under 35 U.S.C. 154(b) by 39 days.

(21) Appl. No.: 16/485,157

(22) PCT Filed: Dec. 14, 2017

(86) PCT No.: PCT/AU2017/000276
§ 371 (c)(1),
(2) Date: Aug. 10, 2019

(87) PCT Pub. No.: WO2018/170527
PCT Pub. Date: Sep. 27, 2018

(65) Prior Publication Data
US 2020/0071069 A1    Mar. 5, 2020

(30) Foreign Application Priority Data

Mar. 21, 2017  (AU) .............................. 2017900998

(51) Int. Cl.
*B65D 88/00*    (2006.01)
*B65D 88/52*    (2006.01)
(52) U.S. Cl.
CPC ................................ *B65D 88/524* (2013.01)

(58) Field of Classification Search
CPC .... B65D 88/522; B65D 88/52; B65D 88/121; B65D 88/005; B65D 90/008
(Continued)

(56) References Cited

U.S. PATENT DOCUMENTS 3,752,349 A * 8/1973 Rana ................... B65D 88/524
  220/6
8,573,433 B2 * 11/2013 Kochanowski ...... B65D 88/524
  220/666
(Continued)

FOREIGN PATENT DOCUMENTS

CN    203 359 247 U    12/2013
CN       203359247 * 12/2013 ............. B65D 88/52
(Continued)

OTHER PUBLICATIONS

PCT Search Report, dated Feb. 5, 2018.

*Primary Examiner* — James N Smalley
*Assistant Examiner* — Elizabeth J Volz
(74) *Attorney, Agent, or Firm* — Dority & Manning, P.A.

(57) ABSTRACT

A collapsible intermodal container includes first and second opposing parallel side walls, and an upper wall and a lower wall. The container has an erected configuration in which the upper wall extends from an upper end portion of the first side wall to an upper end portion of the second side wall, and the lower wall extends from a lower end portion of the second side wall to a lower end portion of the first side wall. In a collapsed configuration, the upper wall extends downwardly from the upper end portion of the first side wall to the lower end portion of the first side wall, and the lower wall extends upwardly from the lower end portion of the second side wall to the upper end portion of the second side wall. Front and rear end assemblies close front and rear ends of the container in the erected configuration and are engageable with the second side wall to secure the first side wall with respect to (Continued)

the second wall. In the collapsed configuration, the front and rear end assemblies are engageable with at least a further collapsible intermodal container to secure the first side wall with respect to the further collapsible intermodal container.

21 Claims, 24 Drawing Sheets

(58) Field of Classification Search
USPC .......................... 220/1.5, 6, 4.28, 4.29, 666
See application file for complete search history.

(56) References Cited

U.S. PATENT DOCUMENTS

| 2008/0029508 A1 | 2/2008 | Kochanowski |
| 2020/0079582 A1* | 3/2020 | Press .................... B65D 88/522 |

FOREIGN PATENT DOCUMENTS

| JP | 2002 264993 A | 9/2002 |
| WO | WO 2013/025676 A1 | 2/2013 |

* cited by examiner

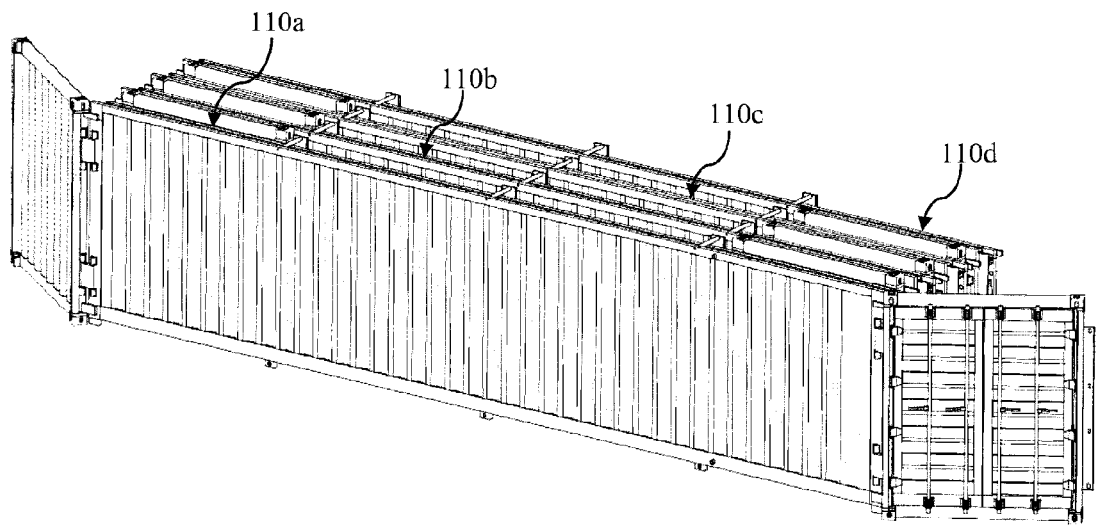
Fig. 30
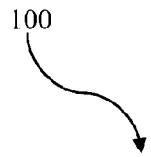
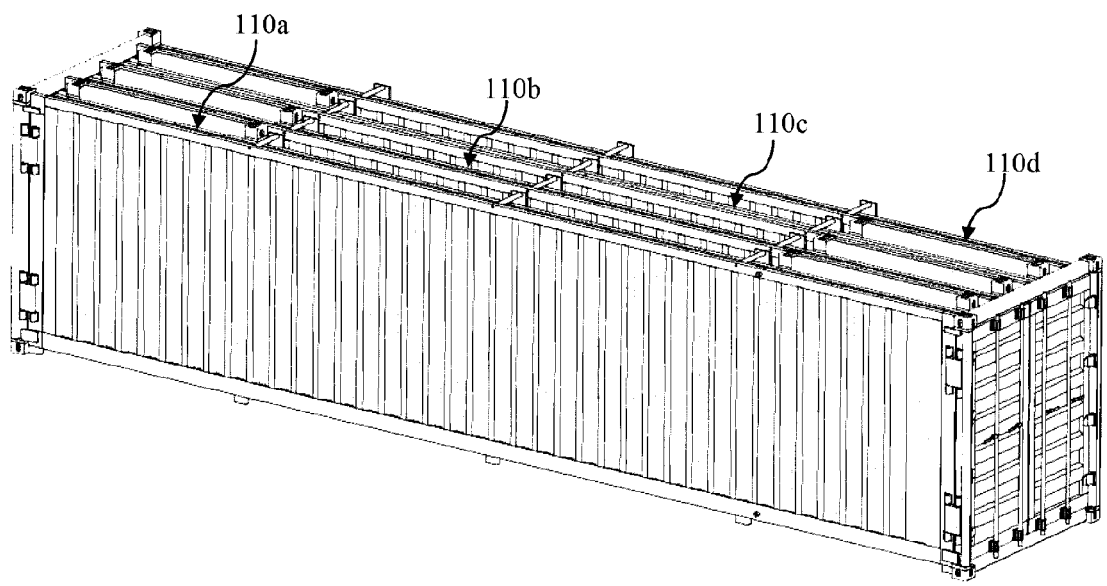
Fig. 31

COLLAPSIBLE INTERMODAL CONTAINER AND A COLLAPSIBLE INTERMODAL CONTAINER ASSEMBLY

FIELD

The present invention relates to a collapsible intermodal container and a collapsible intermodal container assembly.

BACKGROUND

Intermodal containers, also known as ISO containers or shipping containers, are used to store a wide range of goods for transportation. In general, an intermodal container is a rectangular steel box with doors on either end to provide access to the interior in which goods are stored. The intermodal container also has a casting on each corner for engagement with twistlocks and/or bridge clamps to lock the intermodal container into place or interlock with other intermodal containers when stacked together.

In international trade, there is usually a trade imbalance between an exporting country and an importing country. Typically, intermodal containers are loaded with goods at the exporting country and then transported to the importing country. However, once the intermodal containers arrive at the importing country and the goods are unloaded, the intermodal containers are transported back to the exporting country in an empty state for reuse due to the trade imbalance. The transportation of empty intermodal containers is highly inefficient and involves significant costs, especially in relation to fuel, handling, and storage. In certain circumstances, it can become more cost effective to simply store and/or discard the empty intermodal containers at the importing country rather than transporting them back for reuse.

Also, in domestic logistics activities, similar imbalances and thereby similar disadvantages can occur. For example, the transportation of empty intermodal containers to the manufacturer for loading of goods prior to exportation.

OBJECT OF INVENTION

It is an object of the present invention to substantially overcome or ameliorate one or more of the above disadvantages, or at least provide a useful alternative.

SUMMARY OF INVENTION

In accordance with an aspect of the present invention, there is provided a collapsible intermodal container, comprising:

first and second opposing parallel side walls, the first side wall being connected to the second side wall such that the collapsible intermodal container is configurable between an erected configuration in which the first and second side walls are spaced apart by a first distance to define an interior for storing goods, and a collapsed configuration in which the first and second side walls are spaced apart by a second distance which is less than the first distance; and front and rear end assemblies for closing front and rear ends of the container in the erected configuration and for controlling access to the interior of the container, each of the front and rear end assemblies being hingedly attached to the first side wall, wherein, when the collapsible intermodal container is in the erected configuration, the front and rear end assemblies are engageable with the first and/or second side walls to secure the front side wall with respect to the second side wall, and, when the collapsible intermodal container is in the collapsed configuration, the front and rear end assemblies are engageable with the first side wall and/or with at least a further collapsible intermodal container to secure the first side wall with respect to the further collapsible intermodal container.

When the collapsible intermodal container is in the collapsed configuration, the front and rear end assemblies may be further engageable with the second side wall to locate the second side wall between the front and rear end assemblies.

Each of the front and rear end assemblies may be pivotable between:

a closed position in which the respective end assembly extends substantially perpendicularly from the first side wall, and an open position in which the respective end assembly extends substantially parallel and adjacent to the first side wall. That is, each of the end assemblies may be pivoted via its respective hinged connection to the first side wall to be folded back against, and therefore to be substantially parallel to, an outer side of the first side wall in the open position.

The front and rear end assemblies may be pivoted to the closed positions to engage with the second side wall. That is, each of the end assemblies may be pivoted via its respective hinged connection to the first side wall to extend substantially perpendicularly from the first side wall and to engage with the second side wall in the closed position to close and prevent access to the interior of the container. At least one of the front and rear end assemblies typically comprises one or more doors for accessing the interior of the container in the erected configuration. An end assembly of the collapsible intermodal container having one or more doors is also referred to herein as a "door assembly".

Each of the first and second side walls may comprise:

upper and lower forwardly extending members; and upper and lower rearwardly extending members, wherein the upper and lower forwardly extending members of the first and second side walls are adapted to engage with the front end assembly and the upper and lower rearwardly extending members of the first and second side walls are adapted to engage with the rear end assembly such that the first and second side walls are substantially supported by the front and rear end assemblies.

Each of the front and rear end assemblies may comprise a peripheral rigid frame comprising:

first and second side uprights, each of the first and second side uprights having upper and lower ends;

four corner parts respectively mounted to the ends of the first and second side uprights; and upper and lower cross bars, the upper cross bar extending from the corner part mounted to the upper end of the first side upright to the corner part mounted to the upper end of the second side upright, and the lower cross bar extending from the corner part mounted to the lower end of the first side upright to the corner part mounted to the lower end of the second side upright. In an end assembly having one or more doors for accessing the interior of the container in the erected configuration, the one or more doors are typically supported in the peripheral rigid frame of the end assembly. An end assembly of the collapsible intermodal container not having any door preferably includes an end wall supported within the peripheral rigid frame.

When the upper and lower forwardly extending members of the first and second side walls are engaged with the front end assembly, each of the upper forwardly extending members may abut with one of the corner parts mounted to the upper ends of the first and second side uprights of the front end assembly or the upper cross bar of the front end assembly and each of the lower forwardly extending members may abut with one of the corner parts mounted to the lower ends of the first and second side uprights of the front end assembly or the lower cross bar of the front end assembly.

When the upper and lower rearwardly extending members of the first and second side walls are engaged with the rear end assembly, each of the upper rearwardly extending members may abut with one of the corner parts mounted to the upper ends of the first and second side uprights of the rear end assembly or the upper cross bar of the rear end assembly and each of the lower rearwardly extending member may abut with one of the corner parts mounted to the lower ends of the first and second side uprights of the rear end assembly or the lower cross bar of the rear end assembly.

Each of the front and rear end assemblies may comprise a rigid flap hingedly attached to a respective second side upright and pivotable to attach to the second side wall.

Each of the corner parts may be a corner casting for twistlock and/or bridge clamp engagement.

Preferably, the collapsible intermodal container further comprises at least one lifting system for use in configuring the container to the erected configuration. Each lifting system comprises an elongate, preferably flexible, line or tension member, such as a cable, cord, strap or chain or the like, for use in lifting the upper wall into position when configuring the container to the erected configuration. In addition to the flexible line or tension member, the lifting system preferably also includes a roller mechanism for supporting travel of the flexible line or tension member as it is pulled or drawn and a hold member. One end region of the line or tension member is fastened or secured to a free edge region of the upper wall, from which the line or tension member then extends to pass through or over the roller mechanism to an outer side of the other side wall to which the upper wall is not hinged. The hold member is fixed or secured to an opposite end region of the line or tension member for an operator to hold and draw that line or tension member through or over the roller mechanism to lift the free edge region of the upper wall as the container is configured to the erected configuration. It will be noted, however, that the line or tension member of each lifting system may also be used in lowering the upper wall when the container is being configured to the collapsed configuration.

The collapsible intermodal container desirably includes a plurality of the lifting systems arranged spaced apart along a length of the side wall.

The hold member may be designed as a handle for grasping by hand to apply tension to the line or tension member and/or as a foot hold for insertion of a foot to apply tension to the line or tension member.

The at least one lifting system may include a track or rail attached to the outer side of the side wall for guiding movement of the hold member as the collapsible intermodal container is configured to the erected configuration. The lifting system may further include a bracket that is attached to the outer side of the side wall, preferably at or near the lower end thereof, to which the hold member may be fixed or secured when the intermodal container is in the erected configuration. This may assist to lock or hold the container is in the erected configuration; i.e. by fixing or securing the hold member to the bracket when the line or tension member is in the fully extended position with the upper wall lifted into a substantially horizontal posture.

In accordance with another aspect of the present invention, there is provided a collapsible intermodal container assembly, comprising:

first and second collapsible intermodal containers according to any one of the embodiments of the collapsible intermodal container of the invention described above, each of the first and second collapsible intermodal containers being in the collapsed configuration, wherein the front and rear end assemblies of the first collapsible intermodal container are engaged with the first side wall of the first collapsible intermodal container and the second side wall of the second collapsible intermodal container such that the first side wall of the first collapsible intermodal container is secured to the second side wall of the second collapsible intermodal container.

The front and rear end assemblies of the first collapsible intermodal container may extend substantially perpendicularly from the first side wall of the first collapsible intermodal container to the second side wall of the second collapsible intermodal container, and wherein the front and rear end assemblies of the second collapsible intermodal container may extend substantially parallel and adjacent to the first side wall of the second collapsible intermodal container and are located between the front and rear end assemblies of the first collapsible intermodal container.

The front and rear end assemblies may be further engaged with the second side wall of the first collapsible intermodal container and the first side wall of the second collapsible intermodal container such that the second side wall of the first collapsible intermodal container and the first side wall of the second collapsible intermodal container are located between the front and rear end assemblies of the first collapsible intermodal container.

The collapsible intermodal container assembly may further comprise third and fourth collapsible intermodal containers as described above, wherein each of the third and fourth collapsible intermodal containers are in the collapsed configuration, wherein each of the front and rear end assemblies of the third collapsible intermodal container extends substantially parallel and adjacent to the first side wall of the third collapsible intermodal container and each of the front and rear end assemblies of the fourth collapsible intermodal container extends substantially parallel and adjacent to the first side wall of the fourth collapsible intermodal, and wherein the front and rear end assemblies of the first collapsible container are further engaged with the third and fourth collapsible intermodal containers such that the third and fourth collapsible intermodal container are located between the front and rear end assemblies of the first collapsible intermodal container and substantially supported thereby.

The first, second, third and fourth collapsible intermodal containers may be in a sidewardly stacked formation such that the second side wall of the first collapsible intermodal container abuts with the front and rear end assemblies of the third collapsible intermodal container, the second side wall of the third collapsible intermodal container abuts with the front and rear end assemblies of the fourth collapsible intermodal container, and the second side wall of the fourth collapsible intermodal container abuts with the front and rear end assemblies of the second collapsible intermodal container.

An assembled distance may be between the first side wall of the first collapsible intermodal container and the second side wall of the second collapsible intermodal container is substantially equal to the first distance of the first intermodal container.

The assembled distance may be between 201 centimetres and 226 centimetres.

The assembled distance may be about 221 centimetres.

BRIEF DESCRIPTION OF DRAWINGS

Preferred embodiments of the invention will be described hereinafter, by way of example only, with reference to the accompanying drawings, wherein:

FIG. 1a is an enlarged partial view of a corner of the intermodal container of FIG. 1.

FIG. 30 is a perspective view of the collapsible intermodal containers of FIG. 26, as one of the collapsible intermodal containers is in the collapsed configuration with door assemblies moving from the open positions to the closed positions and the remaining collapsible intermodal containers are in the collapsed configurations with door assemblies in the open positions;

FIG. 31 is a perspective view of the collapsible intermodal container assembly formed by the collapsible intermodal containers of FIG. 26;

DESCRIPTION OF EMBODIMENTS

Figure 1:
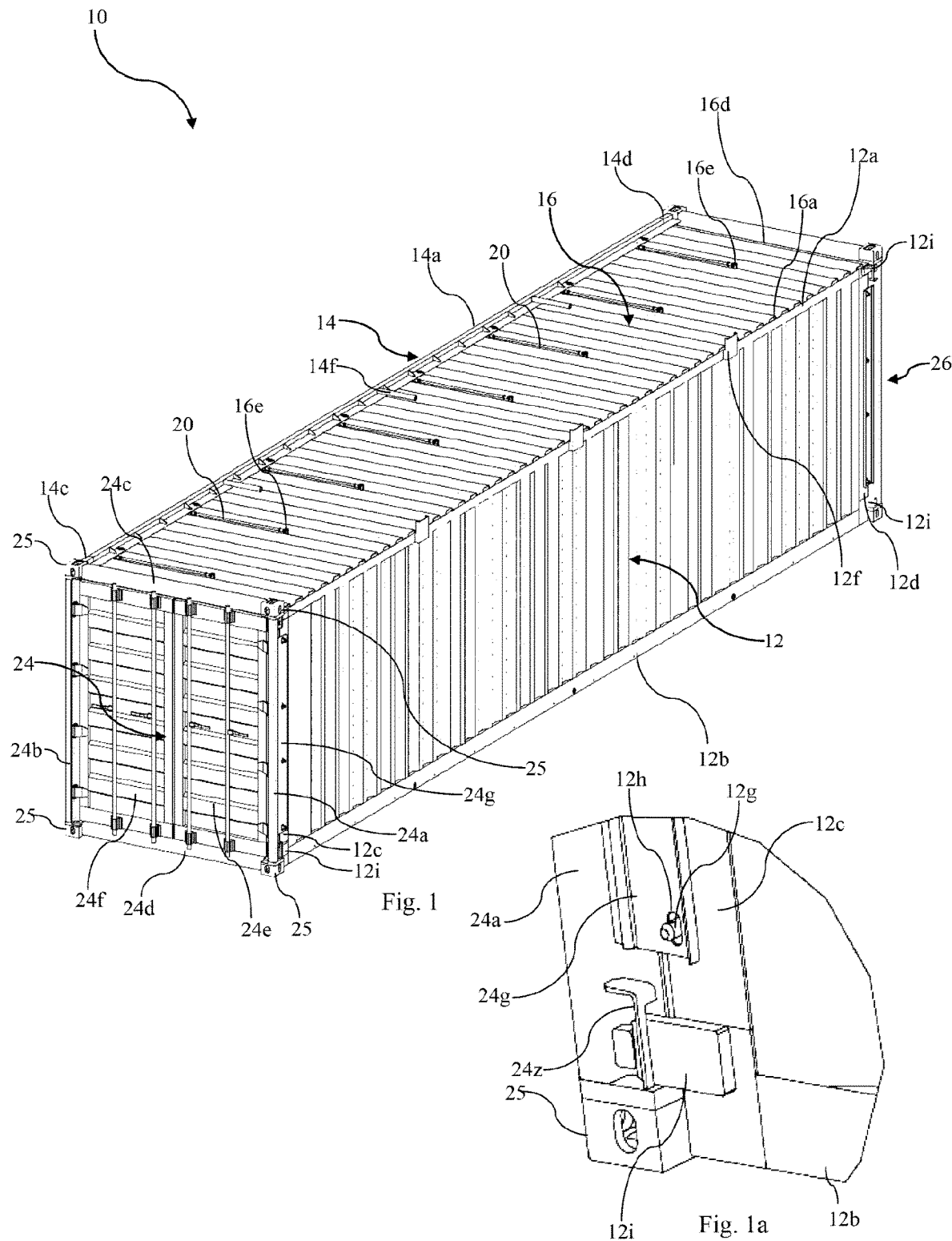
FIG. 1 is a perspective view of a first embodiment of a collapsible intermodal container in the erected configuration with end assemblies or door assemblies in the closed position.
Figure 2:
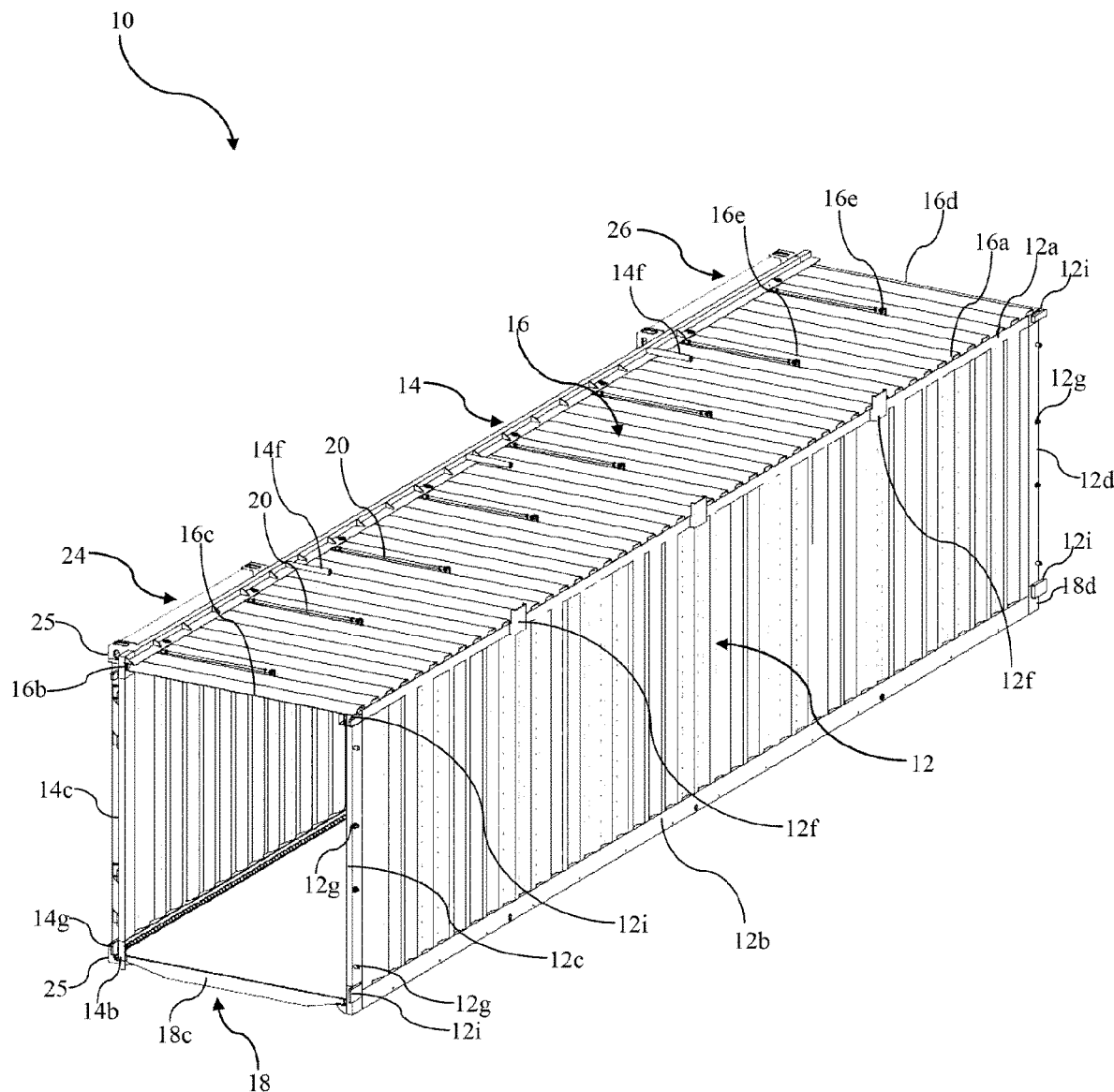
FIG. 2 is a perspective view of the collapsible intermodal container of FIG. 1 with the end assemblies or door assemblies in the open position.
Figure 3:
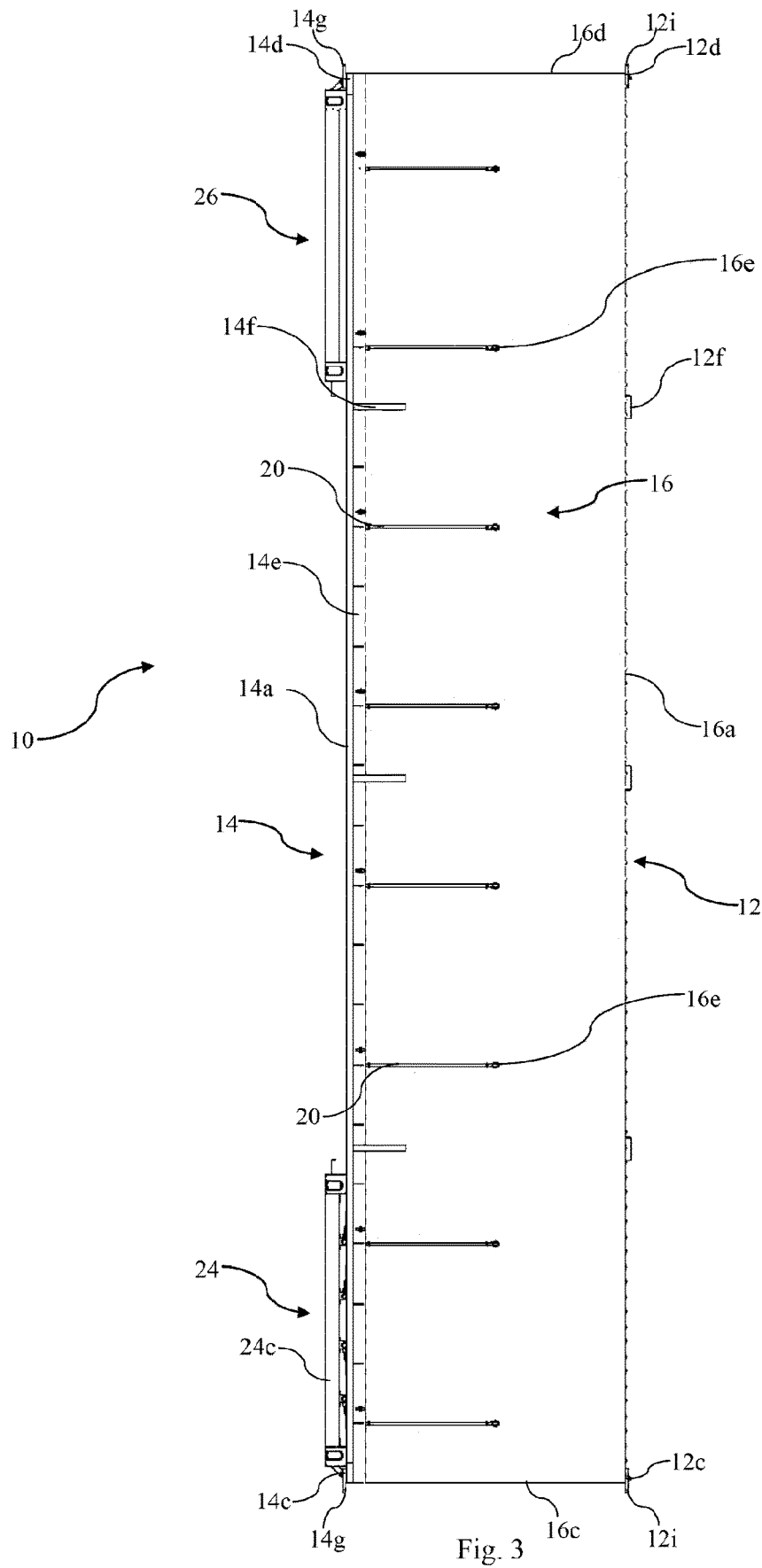
FIG. 3 is a top view of the collapsible intermodal container of FIG. 2.

FIGS. 1 to 12 of the accompanying drawings show a first embodiment of a collapsible intermodal container 10. The container 10 comprises a right side wall 12 and a left side wall 14. The side walls 12, 14 oppose each other and are substantially parallel to each other. Each of the side walls 12, 14 is formed from a rectangular corrugated steel panel which is surrounded by a rectangular steel frame. The right side wall 12 is defined by an upper longitudinal end 12a, a lower longitudinal end 12b, a front end 12c and a rear end 12d. The left side wall 14 is defined by an upper longitudinal end 14a, a lower longitudinal end 14b, a front end 14c and a rear end 14d.

Figure 4:
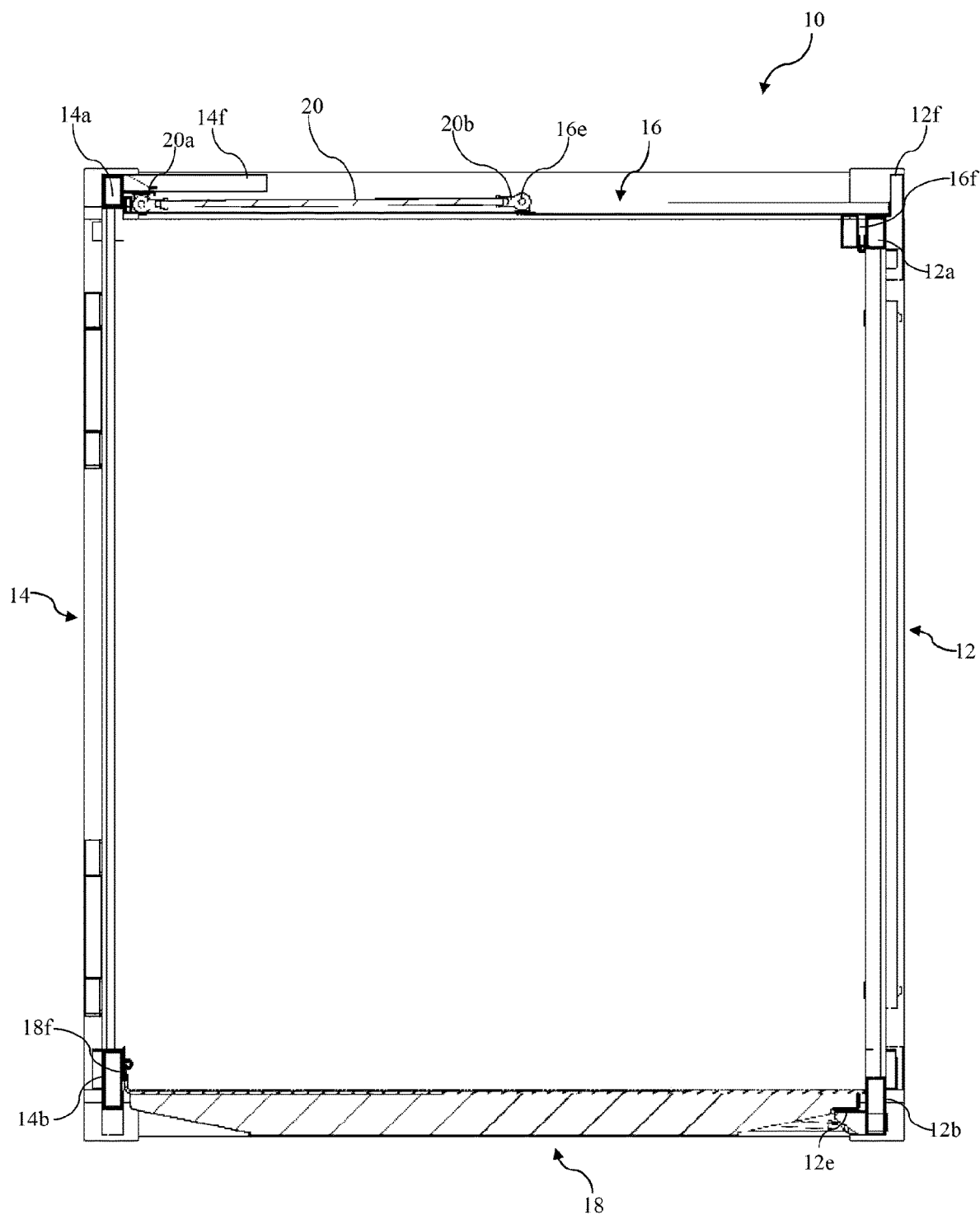
FIG. 4 is a first cross-sectional view of the collapsible intermodal container of FIG. 1.
Figure 9:
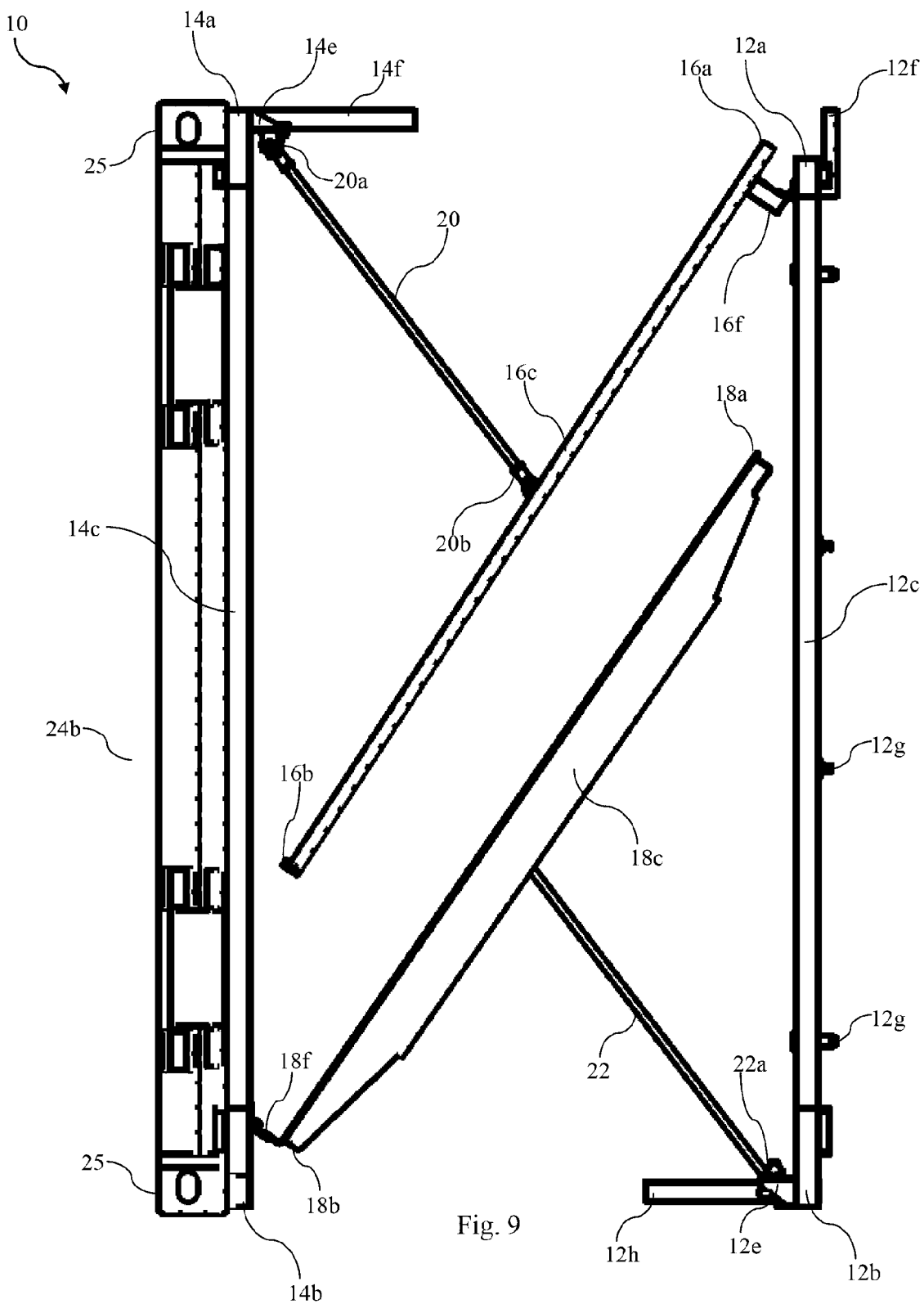
FIG. 9 is an enlarged front view of the collapsible intermodal container of FIG. 7.

As seen in FIG. 4, the right side wall 12 has a lower flange 12e which is disposed at the lower longitudinal end 12b and extends towards the lower longitudinal end 14b of the left side wall 14. The right side wall 12 further has three stop members 12f that are disposed at the upper longitudinal end 12a and are evenly spaced apart between the front end 12c and the rear end 12d. Each of the stop members 12f is formed from a steel channel and extends in an upward direction. The right side wall 12 further has eight pin-like protrusions 12g. Four of the protrusions 12g are disposed at the front end 12c and are evenly spaced apart between the longitudinal ends 12a, 12b. The other four protrusions 12g are disposed at the rear end 12d and are evenly spaced apart between the longitudinal ends 12a, 12b. Each of the protrusions 12g extends in a rightward (i.e. an outward) direction. As best seen in FIG. 9, the right side wall 12 further includes three round steel rods 12h disposed at the lower longitudinal end 12b and evenly spaced apart between the front end 12c and the rear end 12d. Each of the rods 12h extends substantially horizontally in a leftward direction towards the lower longitudinal end 14b of the left side wall 14. The right side wall 12 further has four engagement members in the form of four steel corner plates 12i. Two corner plates 12i are disposed at the front end 12c and extend in a forward direction. The other two plates 12i are disposed at the rear end 12d and extend in a rearward direction.

The left side wall 14 has an upper flange 14e which is disposed at the upper longitudinal end 14a and extends towards the upper longitudinal end 12a of the right side wall 12. The left side wall 14 further includes three round steel rods 14f that are disposed at the upper longitudinal end 14a and slightly above the upper flange 14e. The rods 14f are evenly spaced apart between the front end 14c and the rear end 14d. Each of the steel rods 14f extends substantially horizontally in a rightward direction towards and substantially aligned with a respective stop member 12f. The left side wall 14 further has four engagement members in the form of four steel corner plates 14g. Two corner plates 14g are disposed at the front end 14c and extend in a forward direction. The other two plates 14g are disposed at the rear end 14d and extend in a rearward direction.

Figure 5:
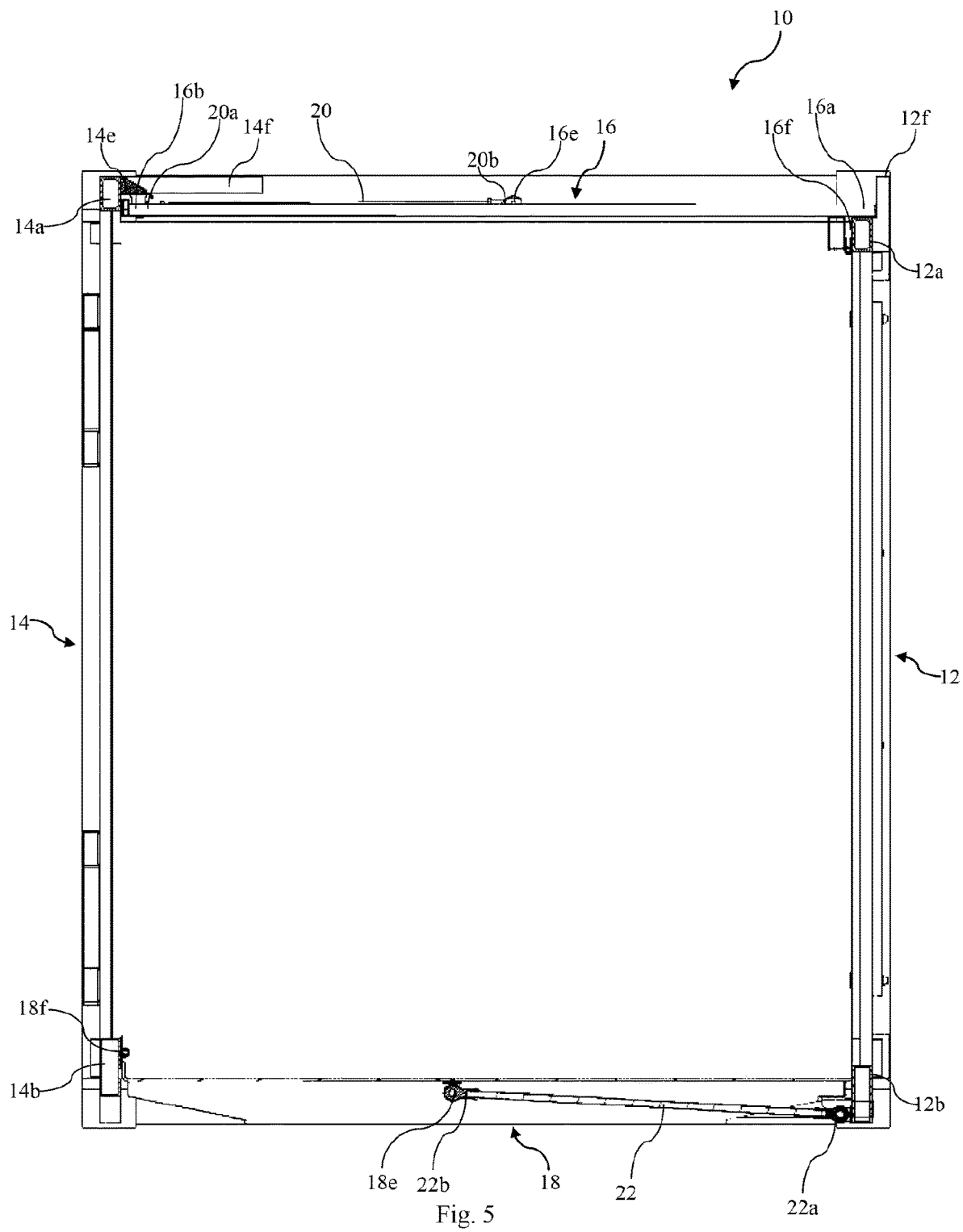
FIG. 5 is a second cross-sectional view of the collapsible intermodal container of FIG. 1.
Figure 6:
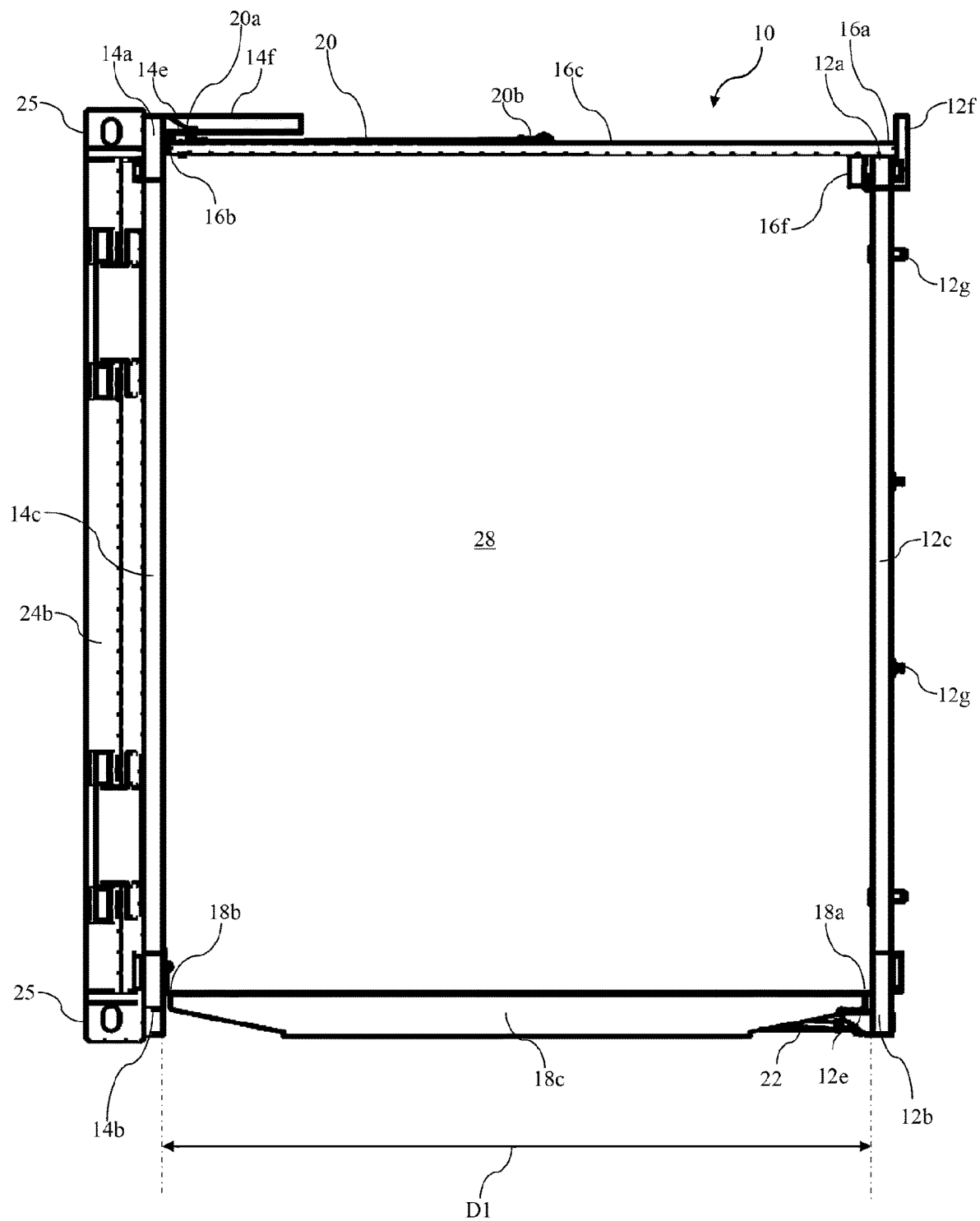
FIG. 6 is an enlarged front view of the collapsible intermodal container of FIG. 2.
Figure 7:
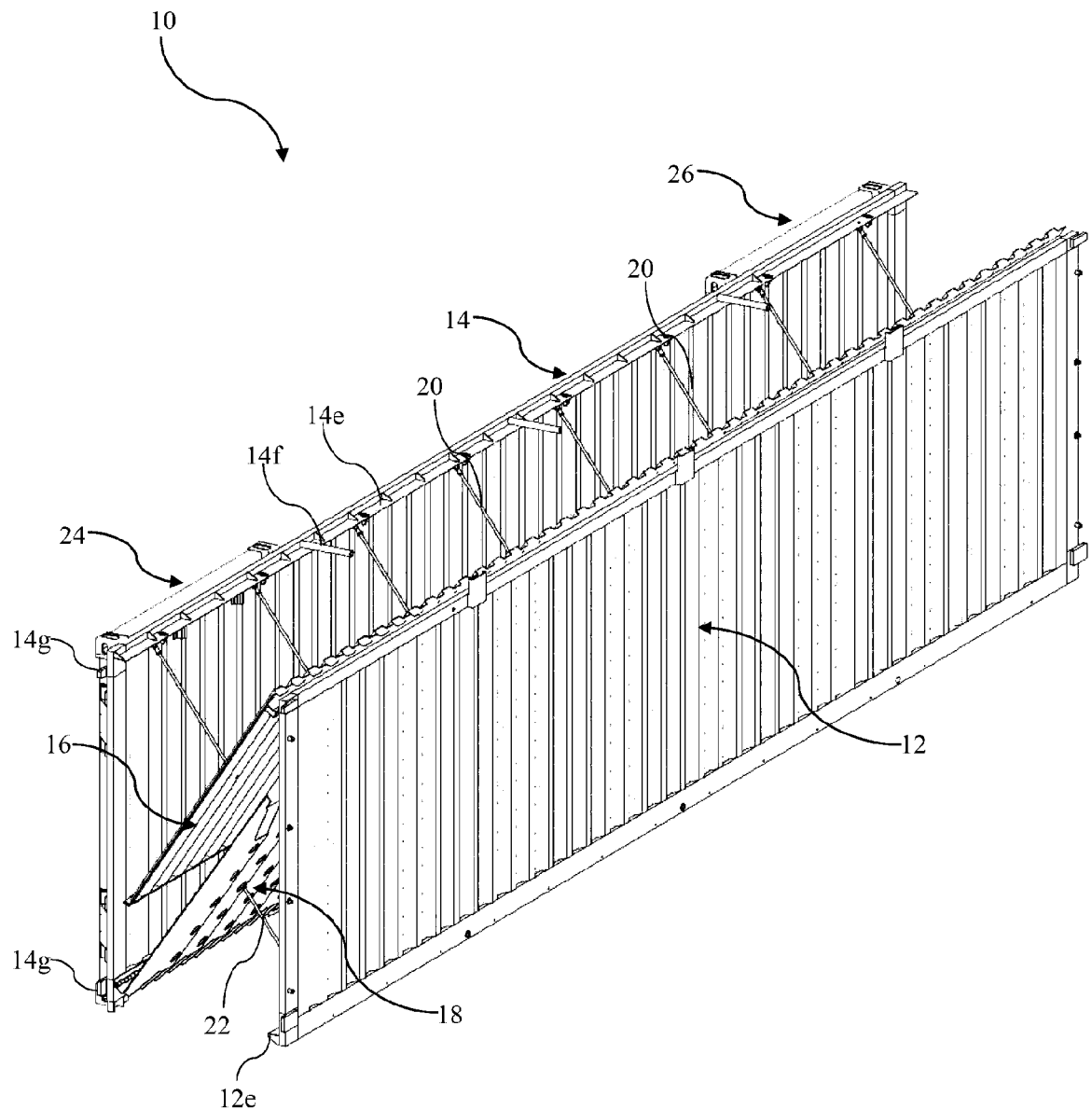
FIG. 7 is a perspective view of the collapsible intermodal container of FIG. 2 configuring from the erected configuration to the collapsed configuration.
Figure 8:
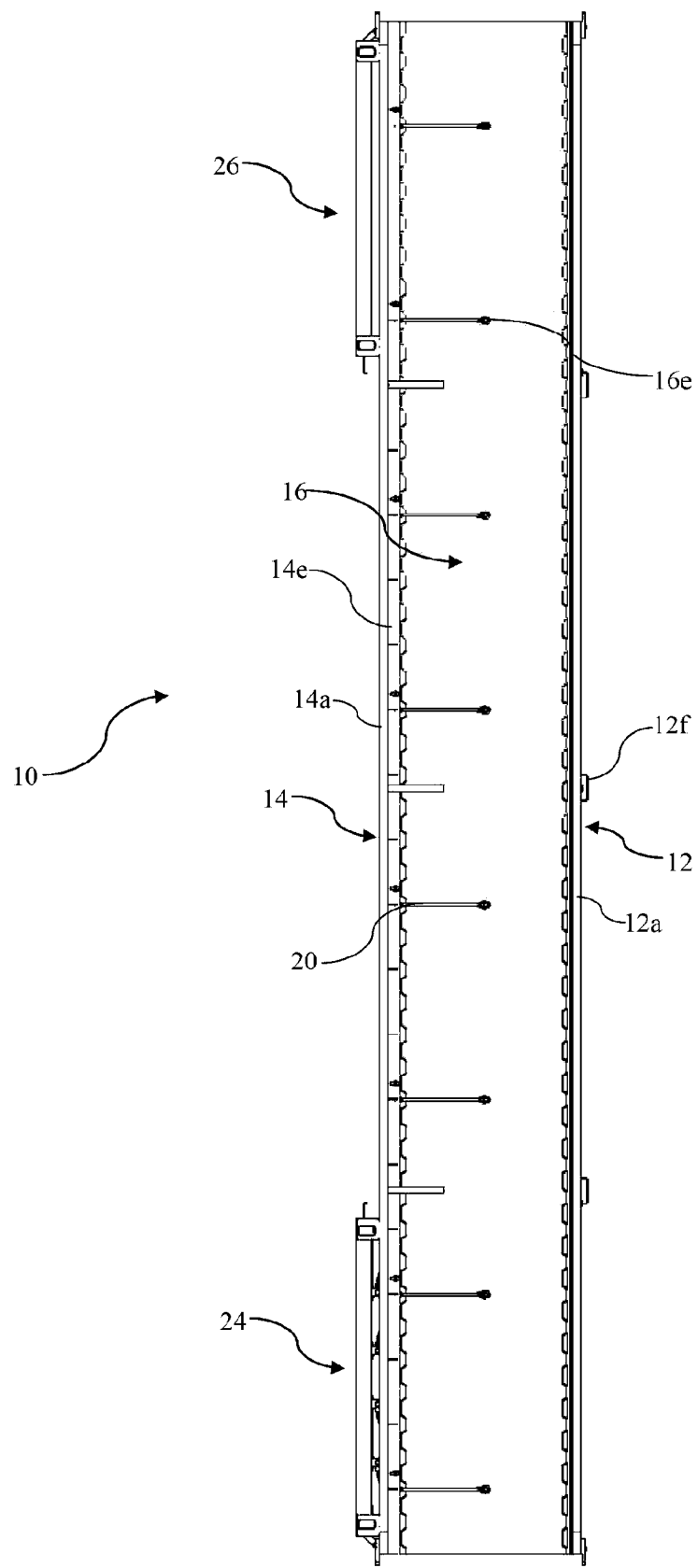
FIG. 8 is a top view of the collapsible intermodal container of FIG. 7.
Figure 12:
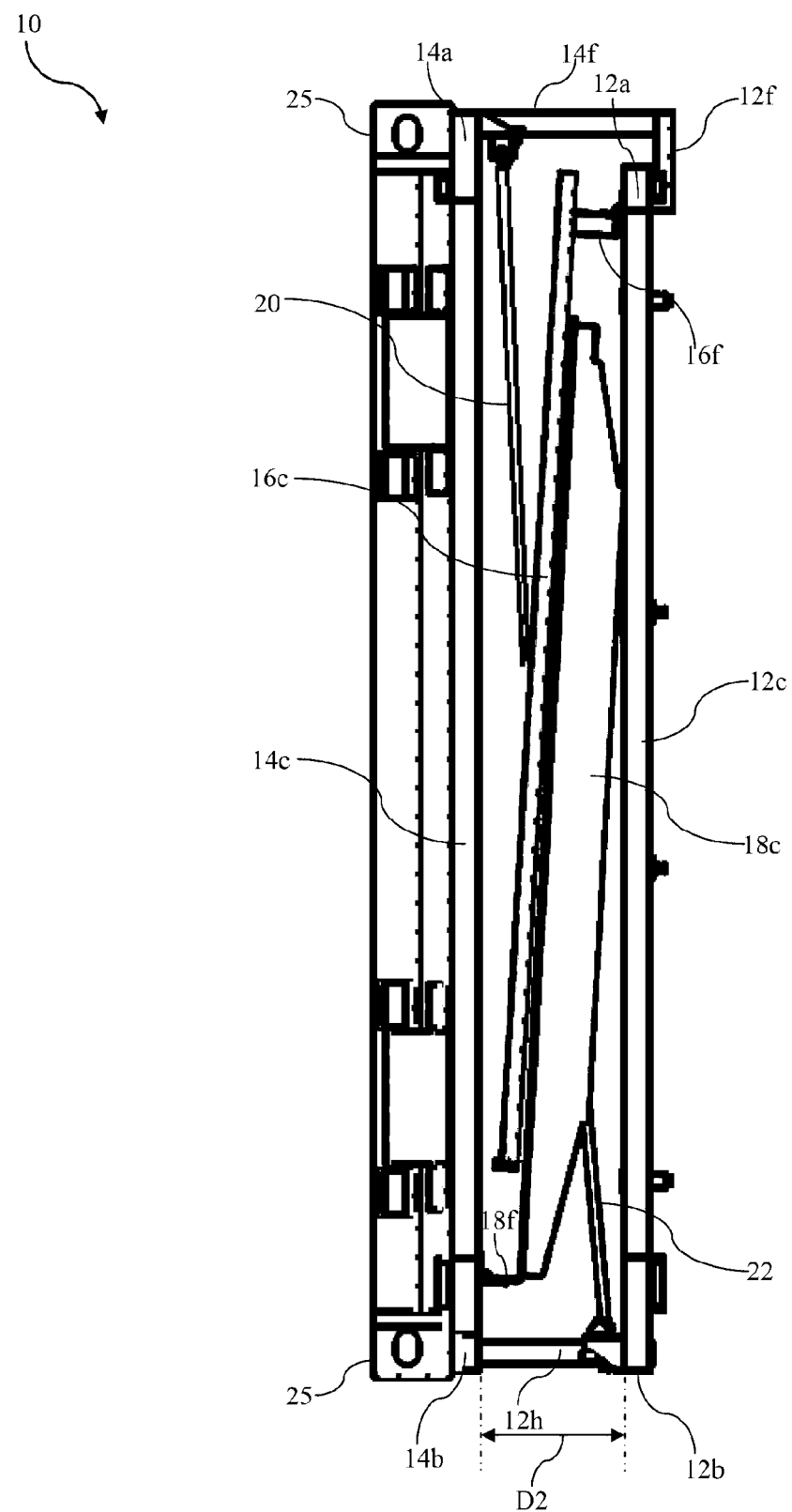
FIG. 12 is an enlarged front view of the collapsible intermodal container of FIG. 10.

The container 10 further comprises an upper wall 16 located between the right side wall 12 and the left side wall 14. The upper wall 16 is fabricated from a rectangular corrugated steel panel. The upper wall 16 is defined by a right longitudinal end 16a, a left longitudinal end 16b, a front end 16c and a rear end 16d. The left longitudinal end 16b is engageable with the upper flange 14e of the left side wall 14 for removable attachment (e.g., by screws and/or bolts). The upper wall 16 has eight lugs 16e disposed on the upper surface of the upper wall 16. The lugs 16e are evenly spaced apart between the front end 16c and the rear end 16d, and each lug 16e extends upwardly from the upper surface of the upper wall 16. As best seen in FIGS. 5 and 6, the upper wall 16 further has a right flange 16f disposed at the right longitudinal end 16a. The right flange 16f is hingedly attached to the upper longitudinal end 12a of the right side wall 12 such that the upper wall 16 is able to pivot in relation to the right side wall 12 via that hinged connection. As best shown in FIGS. 6, 9 and 12, given that the right longitudinal end 16a of the upper wall 16 will abut with the upper longitudinal end 12a of the right side wall 12 as the upper wall 16 pivots to a substantially horizontal posture, it will be appreciated that the pivotal motion of the upper wall 16 is limited to about 90 degrees in relation to the right side wall 12.

The container 10 further comprises a lower wall 18 located between the right side wall 12 and the left side wall 14. The lower wall 18 is fabricated from steel and is substantially rectangular in shape. The lower wall 18 is defined by a right longitudinal end 18a, a left longitudinal end 18b, a front end 18c and a rear end 18d. The right longitudinal end 18a is engageable with the lower flange 12e of the right side wall 12 for removable attachment (e.g., by screws and/or bolts). The lower wall 18 has eight lugs 18e disposed on the lower surface of the lower wall 18. The lugs 18e are evenly spaced apart between the front end 18c and the rear end 18d, and each lug 18e extends downwardly from the lower surface of the lower wall 18.

As best seen in FIGS. 4 and 5, in the depicted embodiment, the left longitudinal end 18b has a left flange 18f hingedly attached to the lower longitudinal end 14b of the left side wall 14 such that the lower wall 18 is able to pivot in relation to the left side wall 14 via that hinged connection. As best shown in FIGS. 6, 9 and 12, given that the left longitudinal end 18b of the lower wall 18 will abut with the lower longitudinal end 14b of the left side wall 14 as the lower wall 18 pivots to a substantially horizontal posture, it will be appreciated that the pivotal motion of the lower wall 18 is limited to about 90 degrees in relation to the left side wall 14.

The container 10 further comprises eight upper link members 20 and eight lower link members 22. Each of the upper and lower link members 20, 22 is elongate and formed from steel. Each upper link member 20 has a first end 20a hingedly attached to the upper flange 14e and a second end 20b hingedly attached to a respective lug 16e of the upper wall 16 such that the upper link members 20 are able to pivot in relation to the left side wall 14. Each lower link member 22 has a first end 22a hingedly attached to the lower flange 12e and a second end 22b hingedly attached to a respective lug 18e of the lower wall 18 such that the lower link members 22 are able to pivot in relation to the right side wall 12.

The container 10 further comprises a front end assembly 24 and a rear end assembly 26, the front and rear end assemblies 24, 26 being designed for closing the front and rear ends of the container 10 in the erected configuration and for controlling access to the interior of the container 10. In this embodiment, the end assemblies 24, 26 include door panels for accessing the interior of the container 10 in the erected configuration. As such, the front and rear end assemblies 24, 26 are also referred to herein as front and rear door assemblies 24, 26. An end assembly of the collapsible intermodal container 10 not having any door will typically simply include an end wall supported within a peripheral rigid frame.

The front door assembly 24 comprises a rectangular peripheral rigid frame which is formed from steel and defines a doorway. The rigid frame of the front door assembly 24 has a right upright member 24a, a left upright member 24b, an upper cross-bar member 24c and a lower cross-bar member 24d. At each corner of the rigid frame of the front door assembly 24, there is disposed a corner casting 25 for engagement with twistlocks and/or bridge clamps. In the depicted embodiment, the left member 24b is hingedly attached to the front end 14c of the left side wall 14 such that the front door assembly 24 is able to pivot in relation to the left side wall 14. Specifically, the front door assembly 24 is able to pivot from a closed position in which the front door assembly 24 extends substantially perpendicularly from the left side wall 14 (see FIG. 1) and an open position in which the front door assembly 24 extends substantially parallel and adjacent the left side wall 14 (see FIG. 2). The front door assembly 24 further comprises a right door panel 24e hingedly attached to the right member 24a and a left door panel 24f hingedly attached to the left member 24b such that the door panels 24e, 24f are able to open and close the doorway in a similar manner to French doors.

With reference to FIGS. 1 and 1a, the front door assembly 24 further comprises a flap member 24g in the form of an elongate planar steel piece. The flap member 24g is hingedly attached to the right member 24a along one of its longitudinal sides such that flap member 24g is able to pivot in relation to the right member 24a. The flap member 24g has four openings 24h that are evenly spaced apart along its length and each opening 24h is adapted to receive a respective protrusion 12g on the front end 12c for removable attachment of the right member 24a of the front door assembly 24 to the front end 12c of the right side wall 12. The front door assembly 24 further comprises four corner brackets 24z disposed at each corner. As best seen in FIG. 1a, each corner bracket 24z defines an opening for slidingly receiving a respective corner plate 12i, 14g on the front ends 12c, 14c such that the respective corner plate 12i, 14g abuts with an adjacent corner casting 25 when received.

Given that, in this depicted embodiment, the front door assembly 24 and the rear door assembly 26 are substantially identical, only the front door assembly 24 is described above in detail. A person skilled in the art will understand that the rear door assembly 26 operates in substantially the same manner and comprises substantially identical components to those described above. However, in the rear door assembly 26, it will be appreciated that the left member is hingedly attached to the rear end 14d of the left side wall 14 and the openings of the flap member of the rear door assembly 26 are adapted to respectively receive the protrusions 12g on the rear end 12d for removable attachment of the right member of the rear door assembly 26 to the rear end 12d of the right side wall 12. Further, in the rear door assembly 26, the openings defined by the corner brackets are adapted to respectively receive the corner plates 12i, 14g on the rear ends 12d, 14d.

The container 10 is configurable between an erected configuration and a collapsed configuration.

As best shown in FIGS. 1 to 6, in the erected configuration, the upper wall 16 extends from the upper longitudinal end 12a of the right side wall 12 to the upper longitudinal end 14a of the left side wall 14 such that the upper wall 16 is substantially perpendicular to the right and left side walls 12, 14. The left longitudinal end 16b abuts and engages the upper flange 14e of the left side wall 14. The upper link members 20 are located above the upper wall 16. Additionally, in the erected configuration, the lower wall 18 extends from the lower longitudinal end 14b of the left side wall 14 to the lower longitudinal end 12b of the right side wall 12 such that the lower wall 18 is substantially perpendicular to the right and left side walls 12, 14. The right longitudinal end 18a abuts and engages the lower flange 12e of the right side wall 12. The lower link members 22 are below the lower wall 18.

In the erected configuration, the upper wall 16 is spaced apart from the lower wall 18 and the upper wall 16 extends parallel to the lower wall 18 such that an inner surface of the upper wall 16 is generally parallel to an inner surface of the lower wall 18. Accordingly, as best shown in FIG. 6, the right side wall 12 and the left side wall 14 are spaced apart by a first normal distance D1 of about 221 centimetres to define an interior 28 for storing goods. The first normal distance D1 (i.e., the width of the interior 28) is in accordance with requirements outlined by the International Standard Organization (ISO) in relation to standardised intermodal containers.

It will be appreciated that, in other embodiments, the first normal distance D1 may be between 201 centimetres to 226 centimetres.

Referring specifically to FIGS. 1 and 1a, when the container 10 is in the erected configuration, the door assemblies 24, 26 are in the closed position with the rigid frame of the front door assembly 24 abutting the front ends 12c, 14c, 16c, 18c and the rigid frame of the rear door assembly 26 abutting with the rear ends 12d, 14d, 16d, 18d to enclose the interior 28. In addition, the openings of the flap members of the door assemblies 24, 26 receive the respective protrusions 12g for removable attachment. It will be appreciated that, once received, the protrusions 12g may be fixed to the flap members of the door assembles 24, 26 by bolting or any other means. Furthermore, the openings defined by the corner brackets of the door assemblies 24, 26 receive the corner plates 12i, 14g such that the corner plates 12i, 14g abut with respective adjacent corner castings 25. This locates the front and rear door assemblies 24, 26 with respect to the side walls 12, 14 in the erected configuration and allows the walls 12, 14, 16, 18 to be supported by the rigid frames of the door assemblies 24, 26 such that the weight of the walls 12, 14, 16, 18 is transferred to the door assemblies 24, 26. This also allows the rigid frames of the door assemblies 24, 26 to lock the container 10 in the erected configuration by limiting movement between the right and left side walls 12, 14 and to provide the container 10 in the erected configuration with sufficient structural strength and rigidity. In the depicted embodiment, the structural strength of the container 10 in the erected configuration meets the requirements outlined by ISO in relation to standardised intermodal containers. It will be appreciated that access to the interior 28 can be controlled by opening and closing the door panels of each door assembly 24, 26.

To configure the container 10 from the erected configuration to the collapsed configuration, the protrusions 12g are removed from the openings of the flaps of the door assemblies 24, 26 by pivoting the flaps of the door assemblies 24, 26 away from the right wall 12. The corner plates 12i, 14g are then slidingly removed from the openings defined by the brackets of the door assemblies 24, 26 as the door assemblies 24, 26 are pivoted to the open positions (see FIGS. 2, 3 and 6). Then, as the container 10 configures from the erected configuration to the collapsed configuration (see FIGS. 7 to 9), the upper wall 16 pivots towards the right side wall 12 and the lower wall 18 pivots towards the left side wall 14. Consequently, the upper link members 20 pivots towards the left side wall 14 and the lower link members 22 pivots towards the right side wall 12. These rotations allow the right side wall 12 to move closer to the left side wall 14. In the depicted embodiment, as the container 10 configures from the erected configuration to the collapsed configuration, the upper wall 16 will still remain extending substantially parallel to the lower wall 18 as best shown in FIG. 9.

Figure 10:
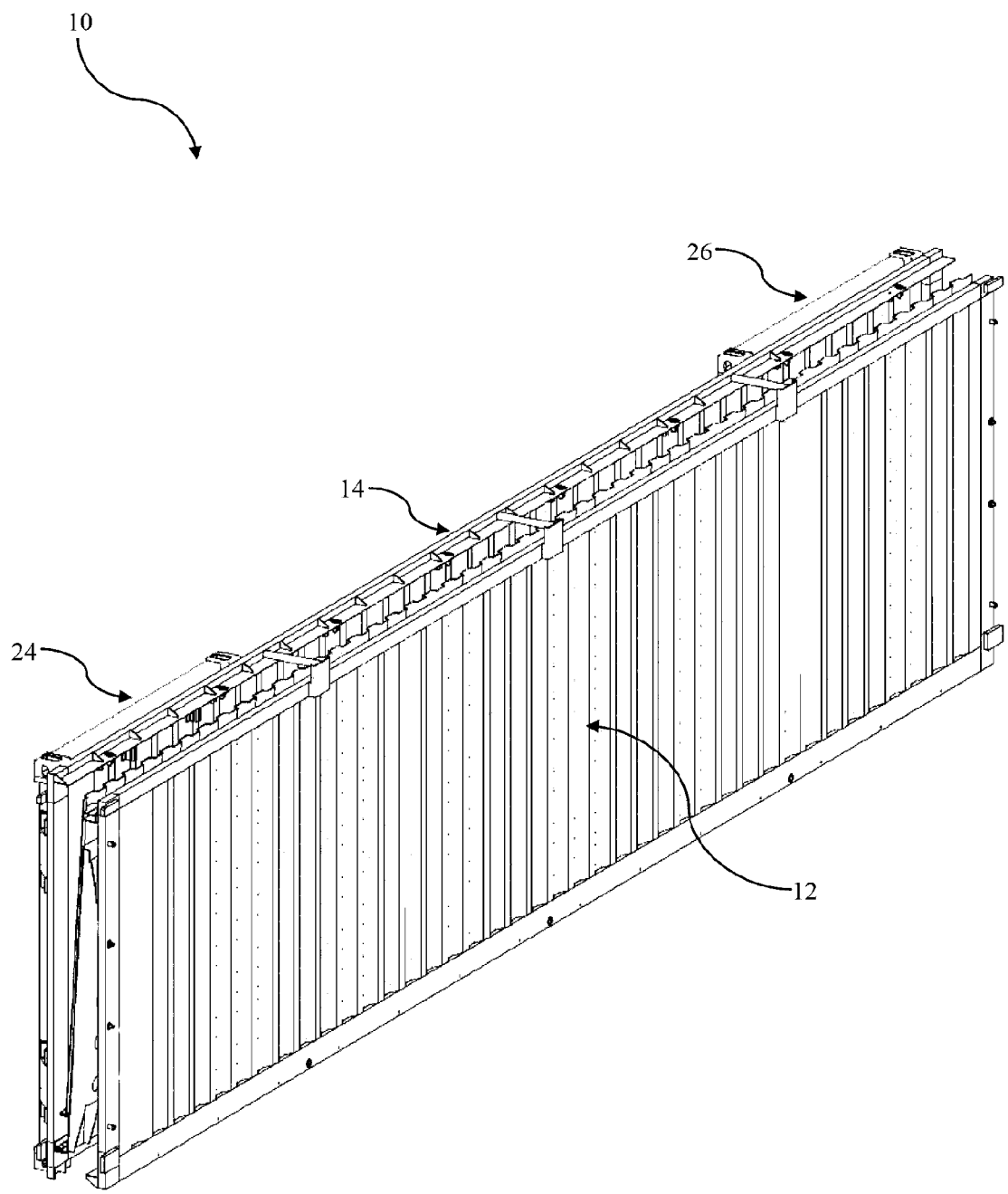
FIG. 10 is a perspective view of the collapsible intermodal container of FIG. 2 in the collapsed configuration.
Figure 11:
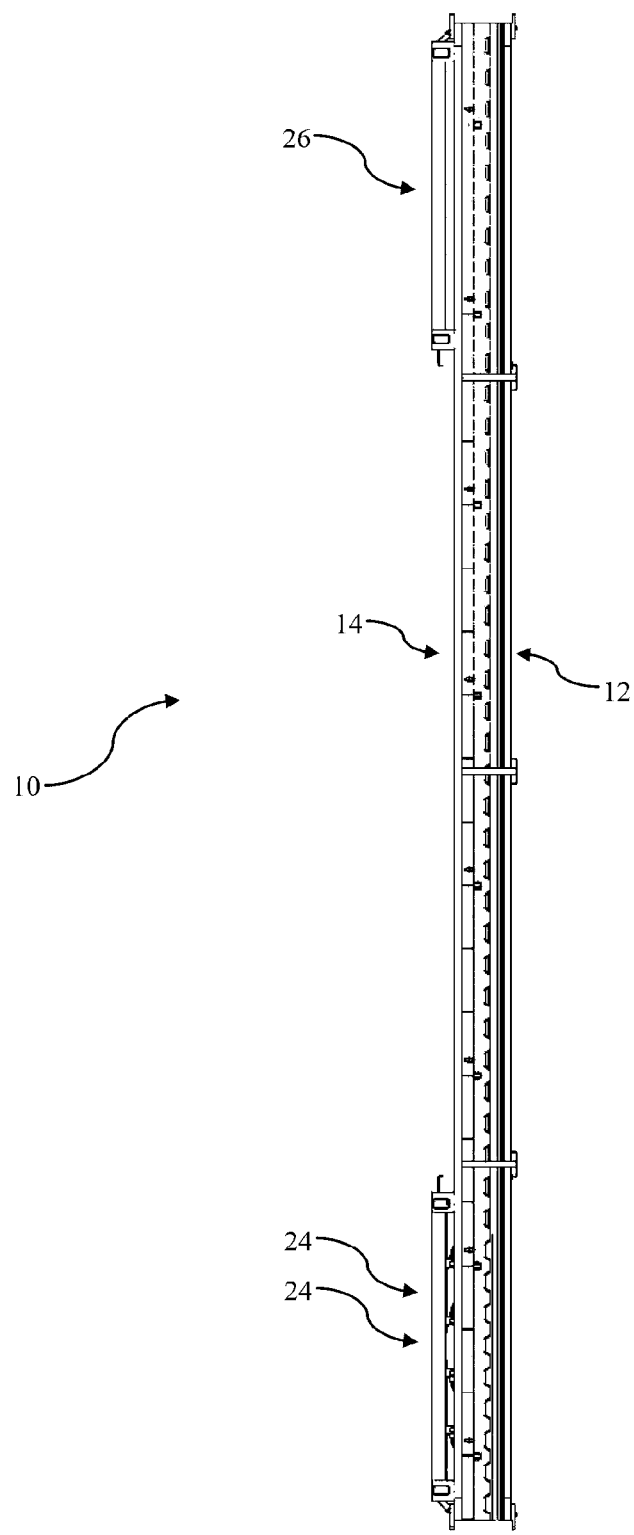
FIG. 11 is top view of the collapsible intermodal container of FIG. 10.

As best shown in FIGS. 10 to 12, once the steel rods 14f abut with the stopping members 12f and the steel rods 12h abut with the lower longitudinal end 14b of the left side wall 14, the right side wall 12 will be prevented from further moving towards the left side wall 14 and the container 10 will be in the collapsed configuration. In this configuration, the upper wall 16 extends downwardly from the upper longitudinal end 12a of the right side wall 12. The upper link members 20 extend downwardly from the upper flange 14e and are located between the left side wall 14 and the upper wall 16. Additionally, in the collapsed configuration, the lower wall 18 extends upwardly from the lower longitudinal end 14b of the left side wall 14. The lower link members 22 extend upwardly from the lower flange 12e of the right side wall 12 and are located between the right side wall 12 and the lower wall 18.

In the collapsed configuration, the upper wall 16 is adjacent to, or abutted with, the lower wall 18. The upper wall 16 extends substantially parallel to the lower wall 18 such that the inner surface of the upper wall 16 is substantially parallel to the inner surface of the lower wall 18. Accordingly, the right side wall 12 and the left side wall 14 are spaced apart by a second normal distance D2 of about 33 centimetres, which is less than the first normal distance D1.

It will be appreciated, in other embodiments, the second normal distance D2 may be between 23 centimetres and 98 centimetres.

In an exemplary method, the container 10 is configured from the erected configuration to the collapsed configuration by manually moving the door assemblies 24, 26 to the open positions. Then, the right wall 12 is fixed relative to a stationary structure and the left wall 14 is moved towards the right wall 12 by an actuator, such as a hydraulic actuator, until the steel rods 14f abut with the stopping members 12f and the steel rods 12h abut with the lower longitudinal end 14b of the left side wall 14. To reverse this process (i.e., configure the container 10 from the collapsed configuration to the erected configuration), the right wall 12 is again fixed to the stationary structure and the left wall 14 is moved from the right wall 12 by the actuator until the link members 20, 22 prevent further movement of the left wall 14.

According to the depicted embodiment, the container 10 in the erected configuration meets the specifications required by ISO, specifically ISO 1496-1:2013—Series 1 Freight Containers, and therefore can be readily used with existing transportation infrastructure. Further, when the container 10 configures from the erected configuration to the collapsed configuration, the container 10 is able to significantly reduce its width. This allows a greater number of empty containers 10 to be transported in a single shipment compared to standard intermodal containers. Also, this allows a greater number of containers 10 to be stored in a defined area compared to standard containers. Furthermore, the container 10 can be readily configured between the erected configuration and the collapsed configuration without the need for assembly and/or removal of parts.

FIGS. 13 to 21 of the accompanying drawings show a second embodiment of a collapsible intermodal container 10'. Features of the collapsible intermodal container 10' that are substantially identical or similar to those of the collapsible intermodal container 10 are provided with the same reference numerals.

Figure 13:
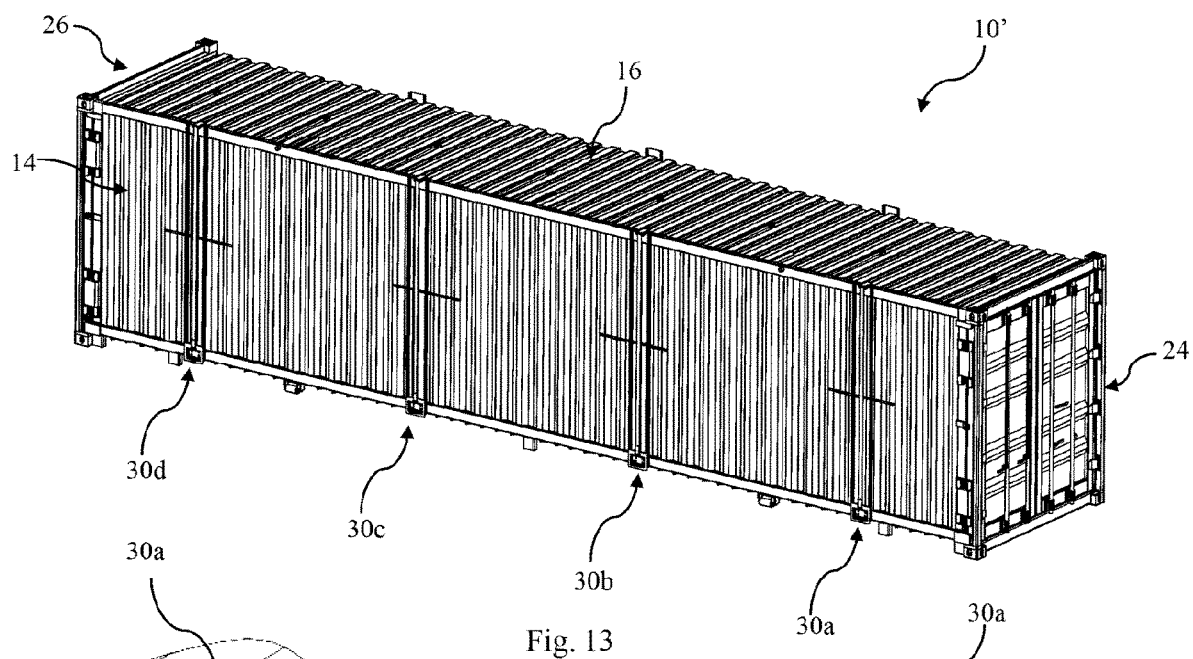
FIG. 13 is a perspective view of a second embodiment of a collapsible intermodal container in the erected configuration with end assemblies or door assemblies in the closed position.
Figure 14:
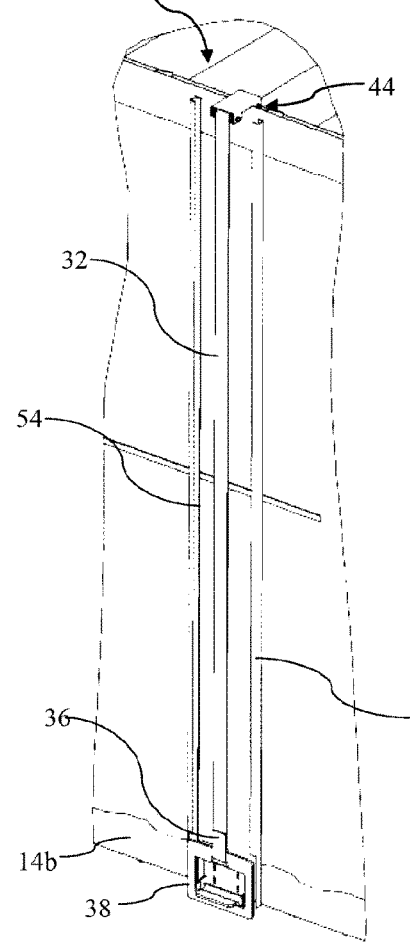
FIG. 14 is an enlarged partial view of a lifting system or strap system of the collapsible intermodal container of FIG. 13.

The collapsible intermodal container 10' is substantially identical to the collapsible intermodal container 10. However, as best seen in FIG. 13, the collapsible intermodal container 10' further comprises four lifting systems 30a, 30b, 30c, 30d for use in configuring the container 10' to the erected configuration. Each of the lifting systems 30a, 30b, 30c, 30d includes an elongate flexible strap 32 for use in lifting the upper wall 16 into position when configuring the container 10' to the erected configuration. For this reason, the lifting systems 30a, 30b, 30c, 30d are also referred to herein as strap systems 30a, 30b, 30c, 30d, and one of these strap systems 30a will now be described in greater detail.

Figure 19:
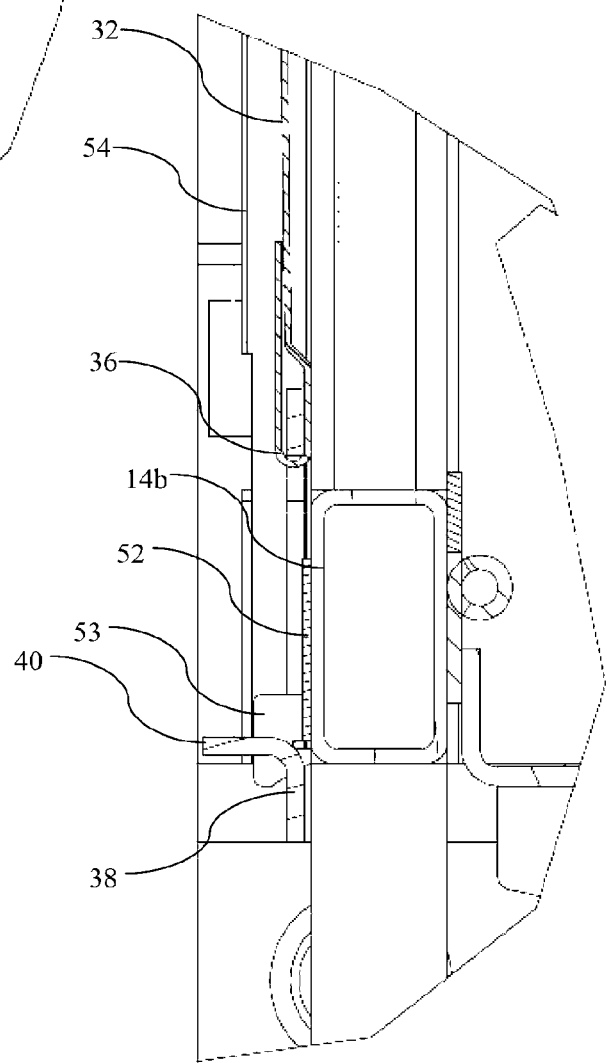
FIG. 19 is an enlarged view of Detail B of FIG. 17.

The strap system 30a comprises a strap 32 with one end 34 attached to the left longitudinal end 16b of the upper wall 16 (see FIG. 18) and another end 36 attached to a foot hold 38 (see FIG. 19). The foot hold 38 is in the form of a steel frame with a shoulder portion 40 and an aperture 42. The strap system 30a further comprises a roller mechanism 44 having a body 46 attached to the upper longitudinal end 14a and a pair of opposing rollers 48, 50 rotatably attached to the body 46 such that the roller 48 is located on the outside of the left wall 14 and the roller 50 is located on the inside of the left wall 14. The strap 32 is threaded through the body 46 of the roller mechanism 44 and engaged with the rollers 48, 50 such that upward or downward movement of one of the ends 34, 36 of the strap 32 causes an opposite movement at the other end 34, 36. The strap system 30a further comprises a bracket 52 attached to the outside of the left wall 14 at or near the lower longitudinal end 14b. The bracket 52 has a pair of protruding members 53. Each of the protruding members 53 has an upwardly extending recess to receive a portion of the foot hold 38 for securement therewith. The strap system 30a further comprises a pair of guide rails 54 attached to the outside of the left wall 14. The guide rails 54 extend from the upper longitudinal end 14a to the bracket 52. Each guide rail 54 defines a channel which receives a portion of the foot hold 38 such that the foot hold 38 is able to slide upwardly and downwardly along the guide rails 54. It will be appreciated, however, that the guide rails 54 limit the sideward movement of the foot hold 38.

Figure 15:
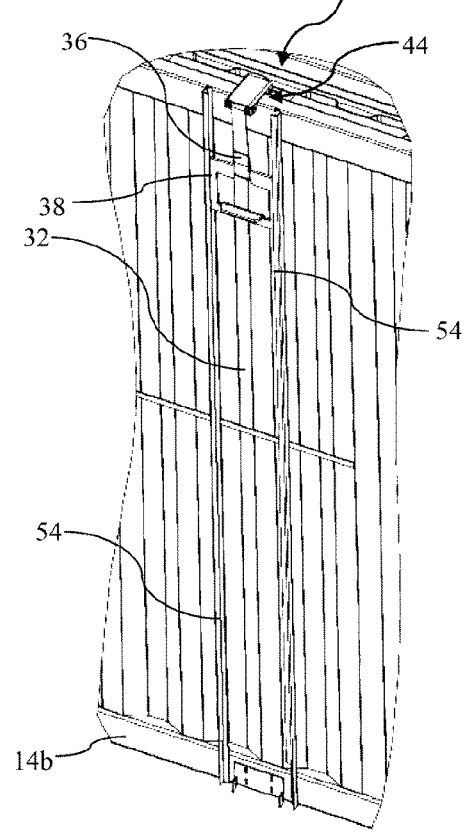
FIG. 15 is an enlarged partial view of the lifting system or strap system of FIG. 14 with the collapsible intermodal container in the collapsed configuration.
Figure 16:
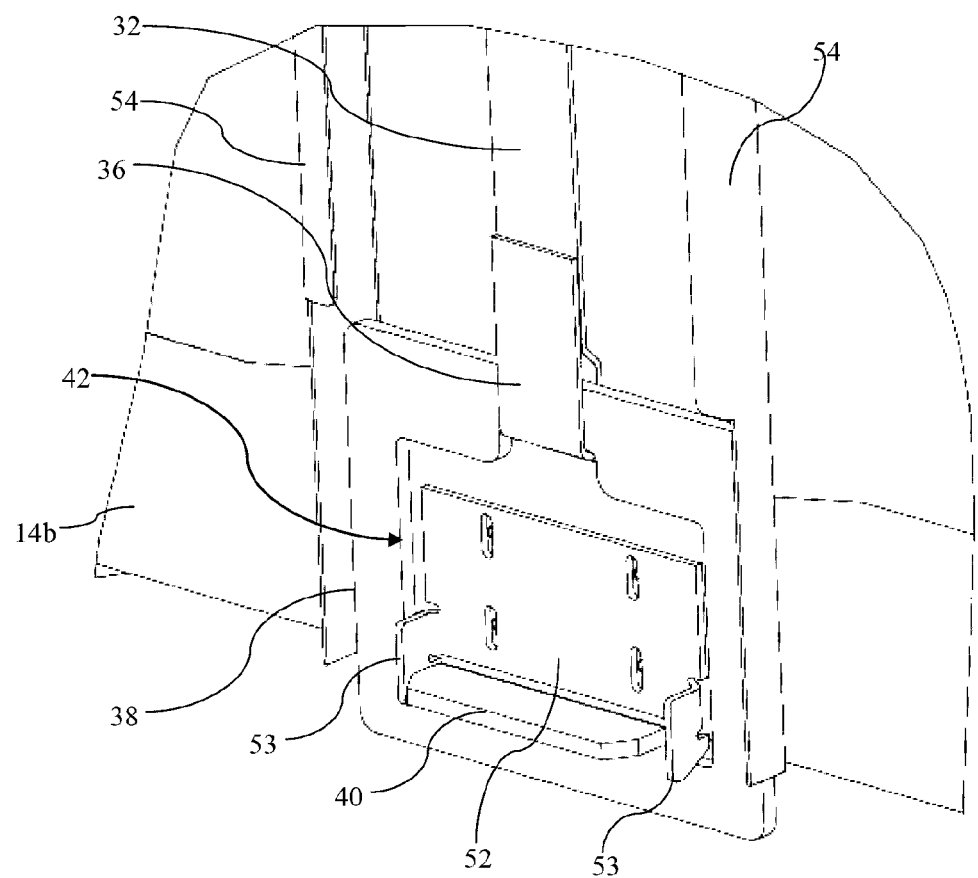
FIG. 16 is an enlarged partial view of a foot hold and a bracket of the lifting system or strap system of FIG. 14.
Figure 17:
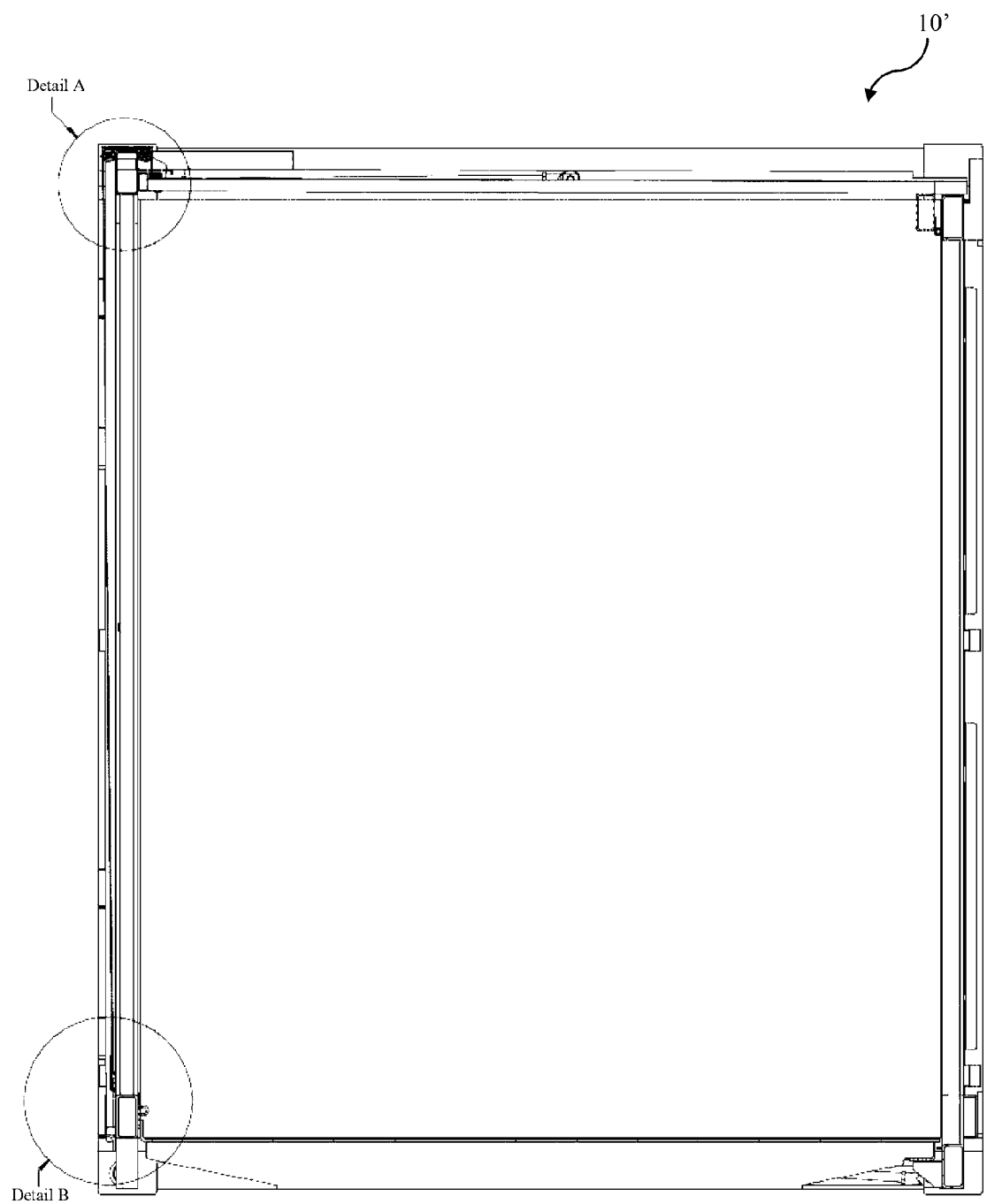
FIG. 17 is a front view of the collapsible intermodal container of FIG. 13 with the end assemblies or door assemblies in the open position.
Figure 18:
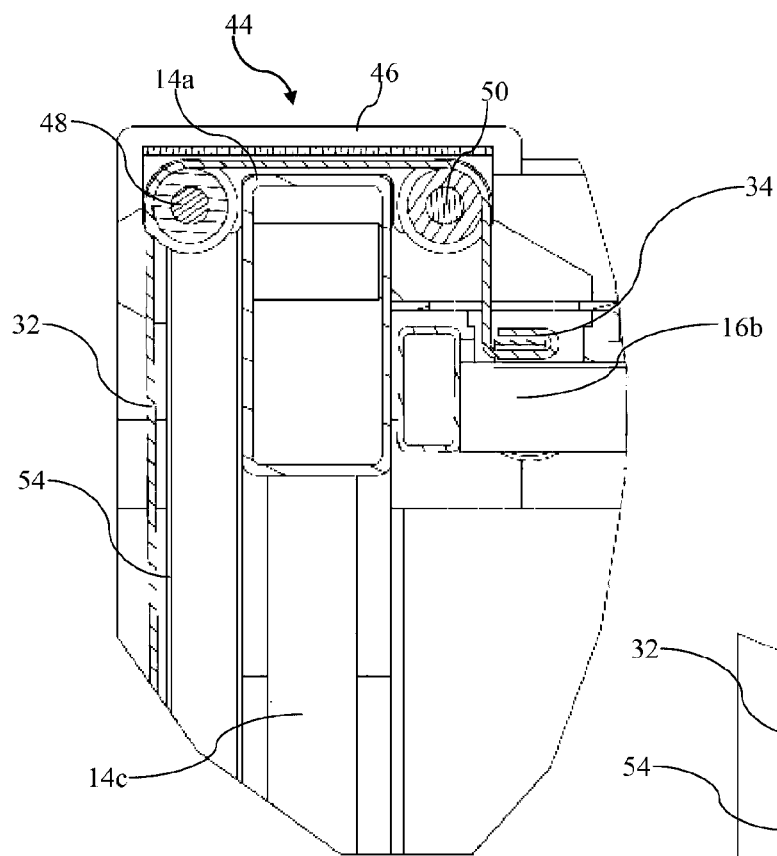
FIG. 18 is an enlarged view of Detail A of FIG. 17.
Figure 21:
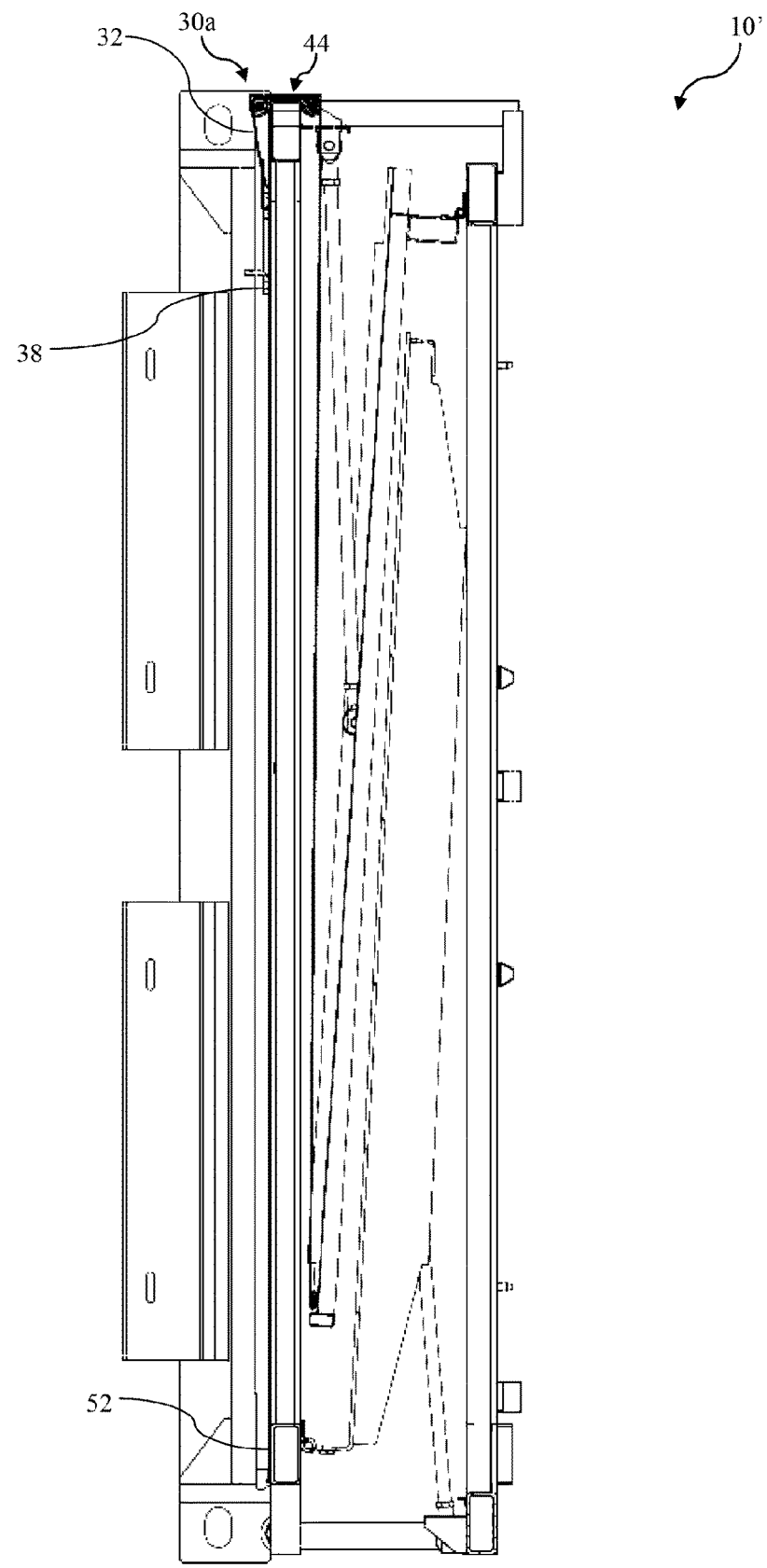
FIG. 21 is a front view of the collapsible intermodal container of FIG. 17 in the collapsed configuration.

As best seen in FIGS. 15 and 21, the container 10' is configured to the collapsed configuration. In this configuration, as the left longitudinal end 16b of the upper wall 16 is located towards the lower longitudinal end 14b of the left wall 14, the strap 32 causes the foot hold 38 to be located near the upper longitudinal end 14a of the left wall 14.

Figure 20:
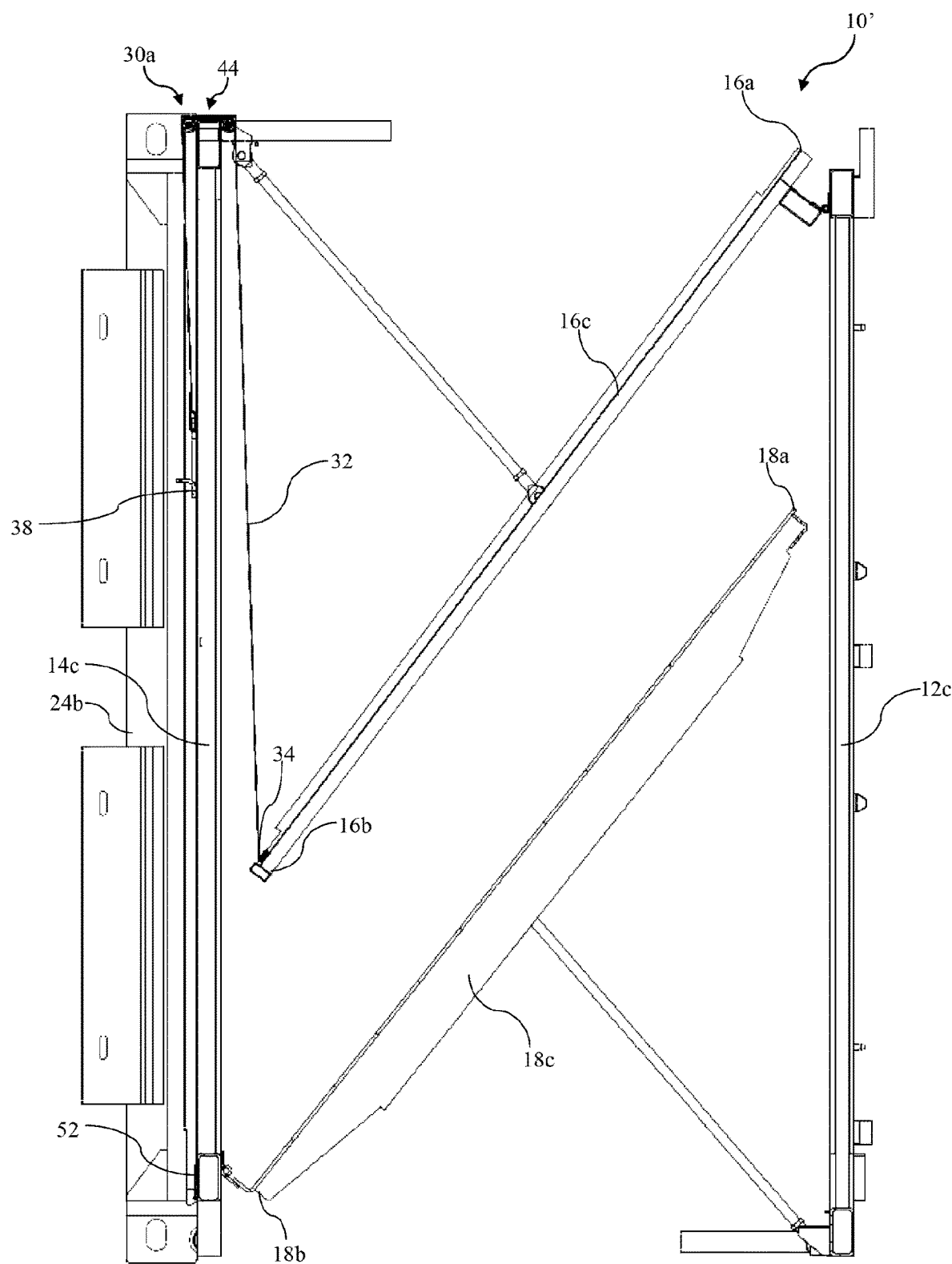
FIG. 20 is a front view of the collapsible intermodal container of FIG. 17 configuring from the collapsed configuration to the erected configuration.

To configure the container 10' to the erected configuration, the foot hold 38 is slidingly moved downwards along the guide rails 54 by a user. This causes the strap 32 to pull the left longitudinal end 16b in an upward direction as best seen in FIG. 20. When the foot hold 38 is near the bracket 52, the user stands on the shoulder portion 40 of the foot hold 38 to force the container 10' into the erected configuration. Then, as best seen in FIGS. 13, 14, and 16 to 19, the foot hold 38 is manipulated such that the pair of protruding members 53 extend through the aperture 42 of the foot hold 38 such that the recesses of the protruding members 53 receive portions of the foot hold 38. This effectively locks the container 10' in the erected configuration.

It will be appreciated that, in order to unlock the container 10' from the erected configuration, the user will stand on the shoulder portion 40 of the foot hold 38 to remove portions of the foot hold 38 from the recesses of the protruding members 53. Then, the user will manipulate the foot hold 38 so that the protruding member 53 are removed from the aperture 42 and the foot hold 38 is free to slide upwardly along the guide rails 54. This will allow the container 10' to configure to the collapsed configuration.

Given that, in this depicted embodiment, each of the strap system 30a, 30b, 30c, 30d are substantially identical, only the strap system 30a is described above in detail. A person skilled in the art will understand that the other strap systems 30b, 30c, 30d operate in substantially the same manner and comprises substantially identical components to those described above.

FIGS. 22 to 25 of the accompanying drawings show a third embodiment of a collapsible intermodal container 10". The features of the collapsible intermodal container 10" that are substantially identical or correspond to those of the collapsible intermodal containers 10, 10' of the first and second embodiments are provided with the same reference numerals and will not be described further.

Figure 22:
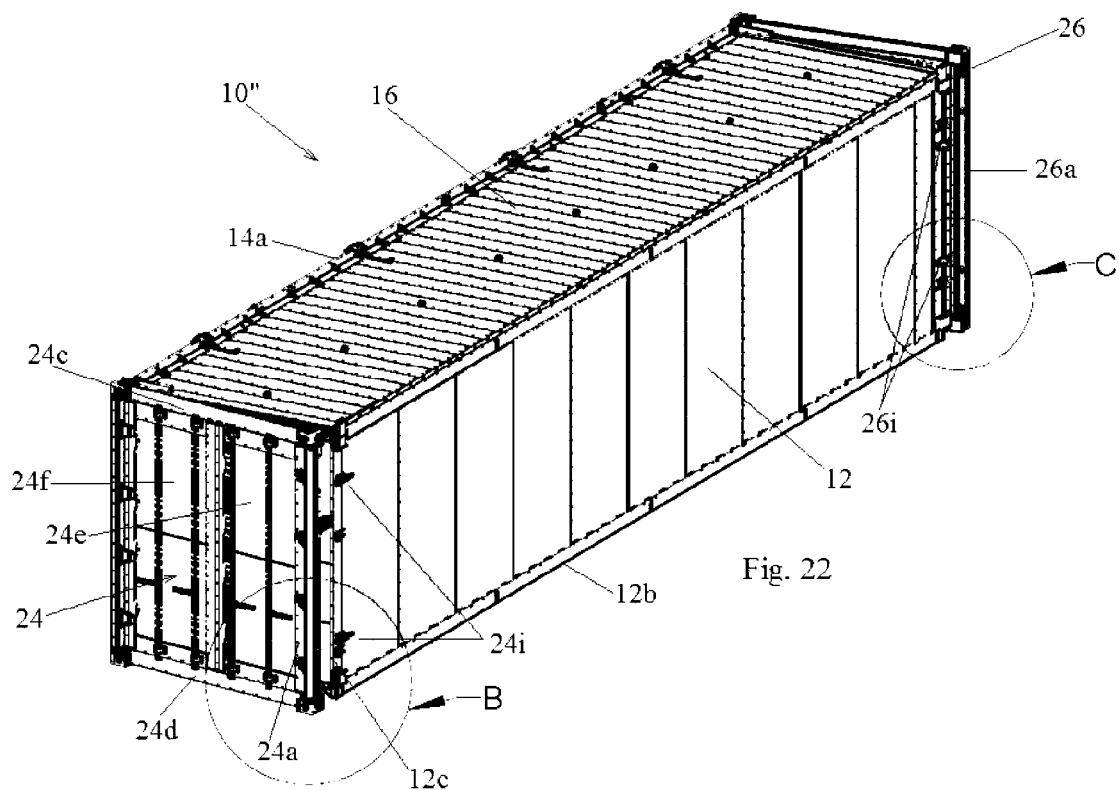
FIG. 22 is a perspective view of a collapsible intermodal container according to a third embodiment in the erected configuration the with end assemblies or door assemblies moved towards the closed position but not yet fully in the closed position.
Figure 23:
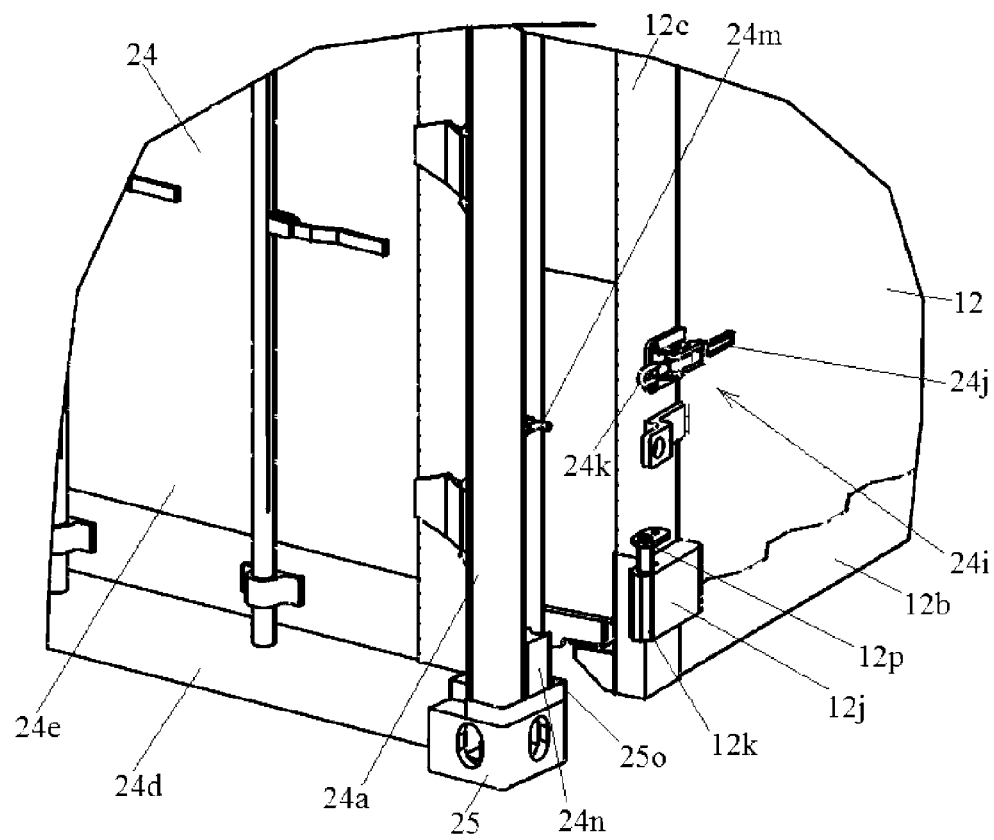
FIG. 23 is an enlarged, more detailed perspective view in the region designated "B" of the collapsible intermodal container shown in FIG. 22.

As can be seen in FIGS. 22 and 23, this third embodiment of a collapsible intermodal container 10" differs in relation to the closure mechanism for locating and securing the front and rear door assemblies 24, 26 in the closed position when the collapsible intermodal container 10" is being configured to the erected configuration. In this embodiment, instead of a closure mechanism comprising a flap member 24g hingedly attached to the right upright member 24a of the front door assembly 24, with openings 24h adapted to receive respective protrusions 12g on the front end 12c of the right side wall 12, the closure mechanism comprises two closure levers 24i fixed to the front end 12c of the right side wall 12, spaced apart as upper and lower closure levers 24i. Each closure lever 24i has a handle 24j that is operable to extend a latch arm 24k for engaging a catch 24m that is fixed to the upright member 24a of the front door assembly 24 and aligned with the latch arm 24k. The handle 24j is further operable to retract the latch arm 24k as it engages the catch 24m to draw the front door assembly 24 into the closed position. An inner side of the door frame members 24a, 24b, 24c, 24d may include a flexible seal or gasket, such as a rubber bead, to cushion and seal the front door assembly 24 against the front ends of the walls 12, 14. 16, 18 in the closed position shown in FIG. 25.

Figure 24:
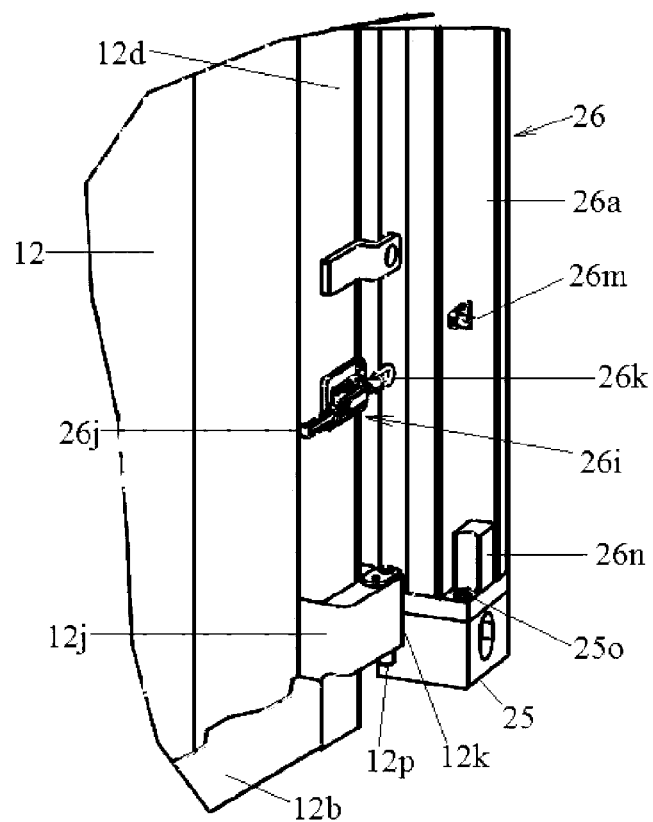
FIG. 24 is an enlarged, more detailed perspective view in the region designated "C" of the collapsible intermodal container shown in FIG. 22.

It will be apparent from FIG. 24 that the rear door assembly 26 also has such a closure mechanism with two closure levers 26i fixed to the rear end 12d of side wall 12, spaced apart as upper and lower closure levers 26i. Again, each closure lever 26i has a handle 26j that operates to extend a latch arm 26k to engage a catch 26m that is fixed to the upright 26a of the rear door assembly 26 and aligned with the latch arm 26k. The handle 26j is operable to retract the latch arm 26k when it engages the catch 26m to draw the rear door assembly 26 into the closed position.

Referring to FIGS. 23 and 24, the intermodal container 10" of this embodiment includes engagement members formed as forwardly and rearwardly extending corner block members 12j that present a tapered end face 12k to matingly engage with or be received by complementary corner elements 24n, 26n of the front and rear door assemblies, respectively. In this way, the respective corner block members 12j cooperate with the corner elements 24n, 26n to locate the door assemblies 24, 26 correctly with respect to the side wall 12 as the door assemblies 24, 26 are moved into the closed position. Furthermore, the corner block members 12j abut with an adjacent corner casting 25 and allow the walls 12, 14, 16, 18 to be at least partly supported by the rigid frames of the door assemblies 24, 26. In this way, the weight of the walls 12, 14, 16, 18 is partly transferred to the door assemblies 24, 26. The corner block members 12j and corner elements 24n, 26n thus replace the corner plates 12i, 14g and the brackets 24z, 26z of the first embodiment. In this case, the forwardly and rearwardly extending corner block members 12j include a steel pin 12p that is captured but movable within a bore through those block members 12j. When each door assembly 24, 26 is in the closed position, the pin 12p may be driven (e.g. with a hammer) through the block 12j to project into a corresponding hole 25o provided in the corner casting 25. Accordingly, in addition to the closure levers 24i, 26i, the pins 12p operate to fix and lock the front and rear door assemblies 24, 26 in their closed positions.

Figure 32:
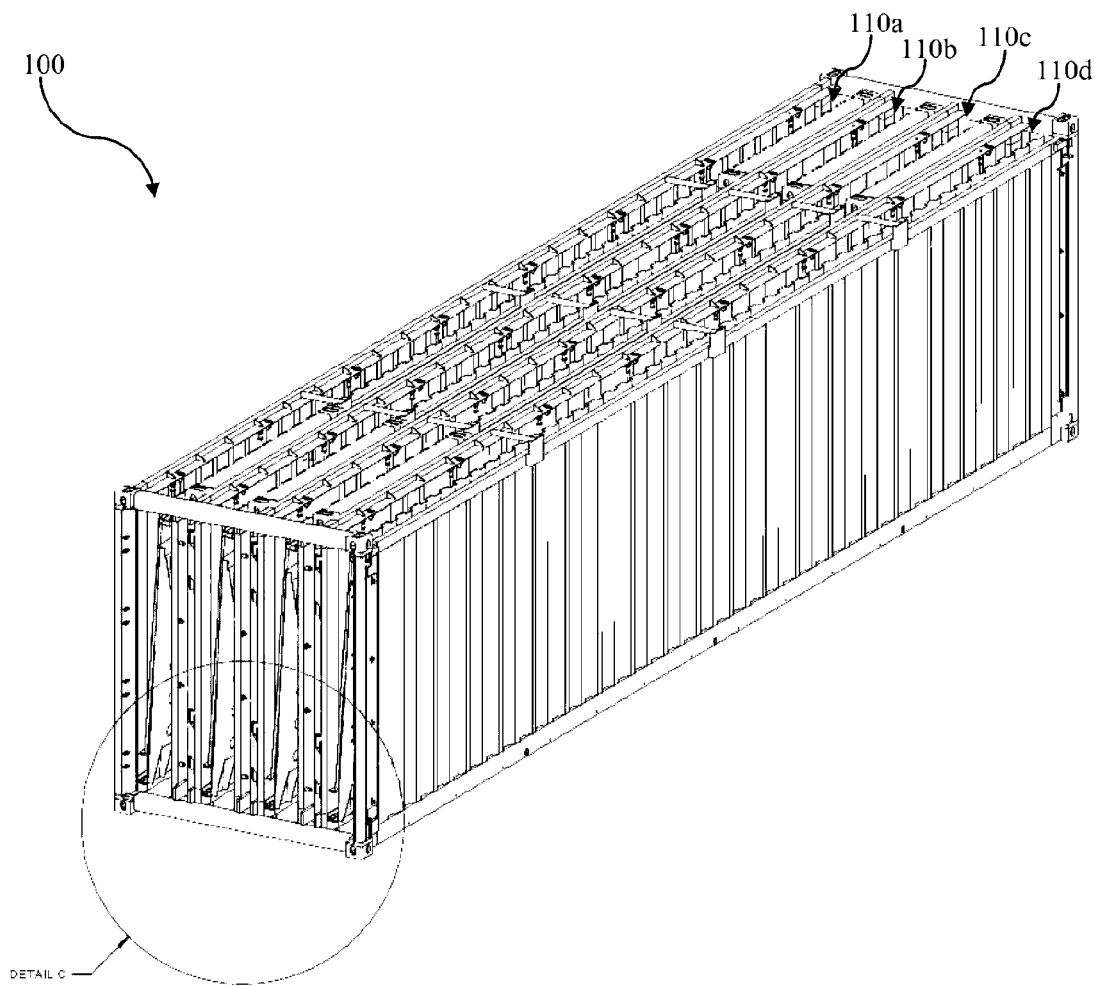
FIG. 32 is another perspective view of the collapsible intermodal container assembly of FIG. 31 with door panels removed.
Figure 33:
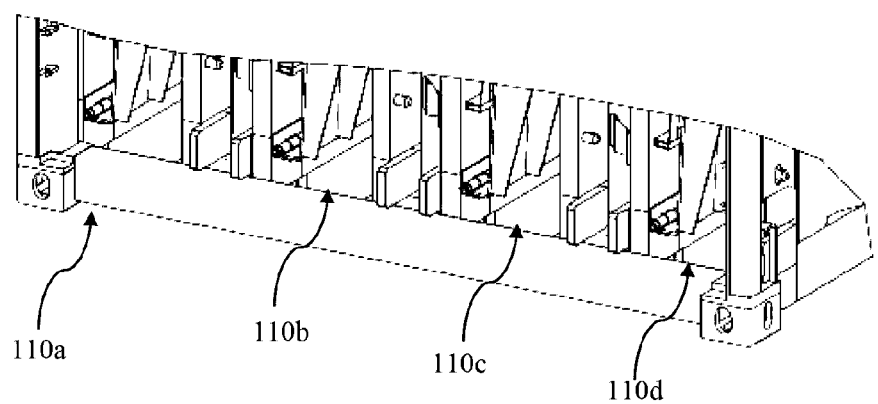
FIG. 33 is an enlarged view of Detail C of FIG. 32.

FIGS. 26 to 33 of the accompanying drawings show four collapsible intermodal containers 110a, 110b, 110c, 110d assembling together to form an embodiment of a collapsible intermodal container assembly 100 as shown in FIGS. 31 to 33. In the depicted embodiment, each of the four collapsible intermodal containers 110a, 110b, 110c, 110d is identical to the collapsible intermodal container 10 described above. Accordingly, features of the collapsible intermodal containers 110a, 110b, 110c, 110d that are identical to those of the collapsible intermodal container 10 are provided with the same reference numerals.

In the depicted embodiment, when all the containers 110a, 110b, 110c, 110d are initially in the erected configurations and separated from each other, the sequential steps set out below are taken to form the collapsible intermodal container assembly 100.

In a first step, the door assemblies 24, 26 of the container 110d are moved to the open positions. The right wall 12 of the container 110d is then fixed relative to a stationary structure (not shown) and the left wall 14 of the container 110d is moved towards the right wall 12 of the container 110d until the container 110d is configured to the collapsed configuration.

In a second step, the right wall 12 of the container 110c is abutted against the door assemblies 24, 26 of the container 110d. The door assemblies 24, 26 of the container 110c are moved to the open positions. As the right wall 12 of the container 110d remains fixed relative to the stationary structure, the left wall 14 of the container 110c is moved towards the right wall 12 of the container 110c until the container 110c is configured to the collapsed configuration.

In a third step, the right wall 12 of the container 110b is abutted against the door assemblies 24, 26 of the container 110c. The door assemblies 24, 26 of the container 110b are moved to the open positions. As the right wall 12 of the container 110d remains fixed relative to the stationary structure, the left wall 14 of the container 110b is moved towards the right wall 12 of the container 110b until the container 110b is configured to the collapsed configuration.

Figure 25:
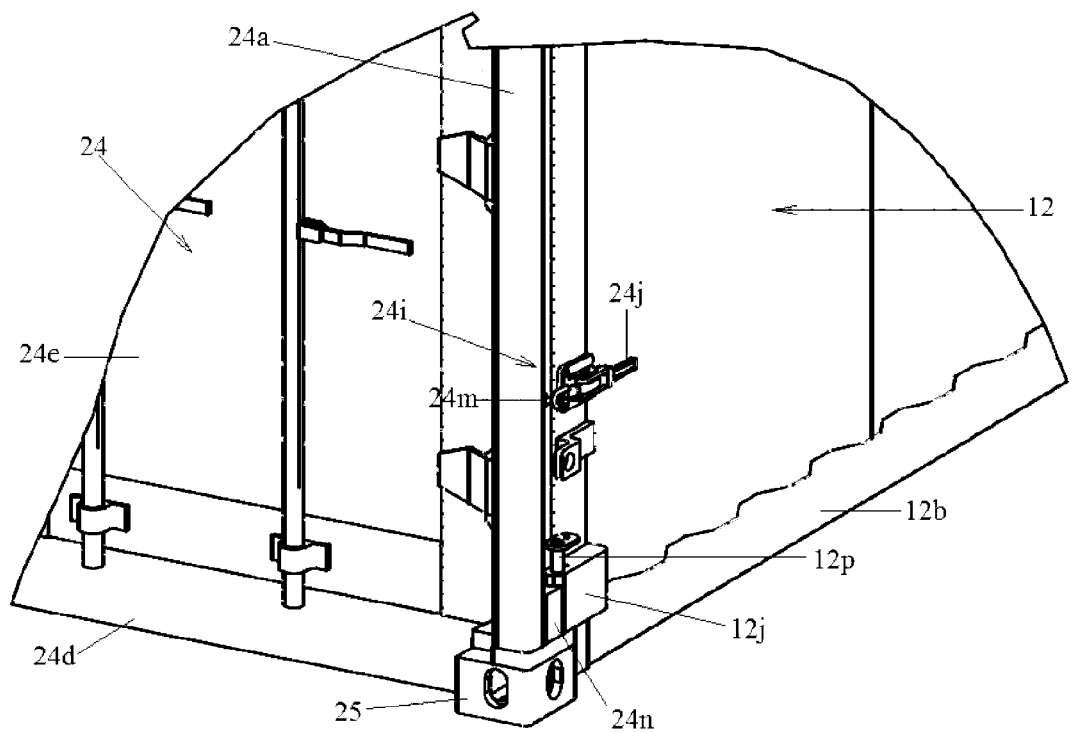
FIG. 25 is a perspective view corresponding to the view shown in FIG. 23, but with the end assembly or door assembly of the collapsible intermodal container in the closed position.
Figure 26:
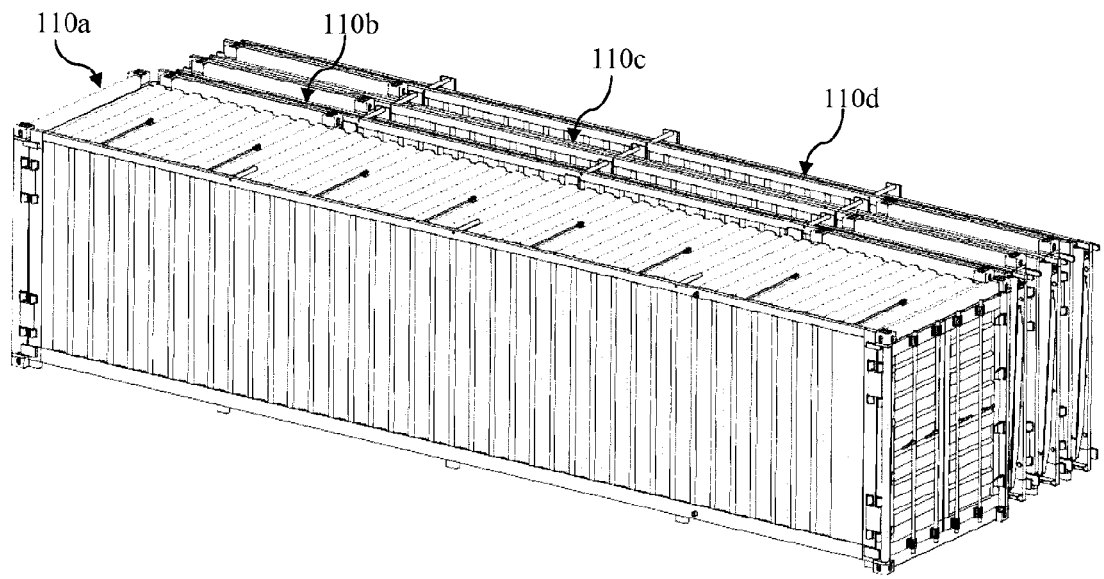
FIG. 26 is a perspective view of four collapsible intermodal containers of FIG. 1 assembling to form an embodiment of a collapsible intermodal container assembly, as one of the collapsible intermodal containers is in the erected configuration with door assemblies in the closed positions and the remaining collapsible intermodal containers are in the collapsed configurations with door assemblies in the open positions.
Figure 27:
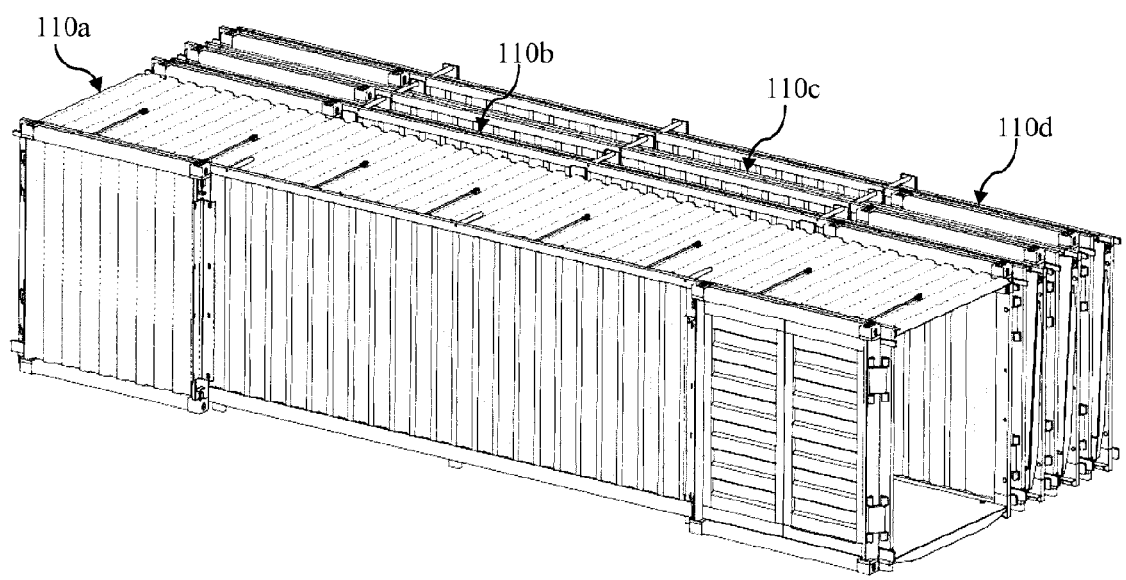
FIG. 27 is a perspective view of the collapsible intermodal containers of FIG. 26, as one of the collapsible intermodal containers are in the erected configuration with door assemblies in the open positions and the remaining collapsible intermodal containers are in the collapsed configurations with door assemblies in the open position.
Figure 29:
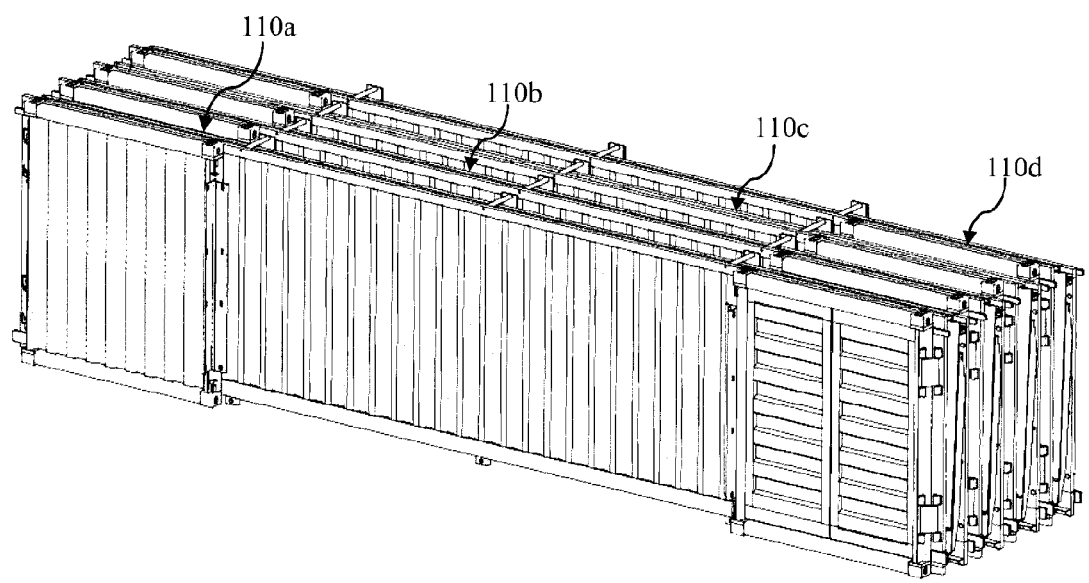
FIG. 29 is a perspective view of the collapsible intermodal containers of FIG. 26, as all of the collapsible intermodal containers are in the collapsed configurations with door assemblies in the open positions.

In a fourth step, as best seen in FIG. 26, the right wall 12 of the container 110a is abutted against the door assemblies 24, 26 of the container 110b. As best seen in FIG. 27, the door assemblies 24, 26 of the container 110a are moved to the open positions. As the right wall 12 of the container 110d remains fixed relative to the stationary structure, as best seen in FIGS. 24 and 25, the left wall 14 of the container 110a is moved towards the right wall 12 of the container 110a until the container is configured to the collapsed configuration. As best seen in FIG. 29, the containers 110a, 110b, 110c, 110d are now in a sidewardly stacked formation.

Figure 28:
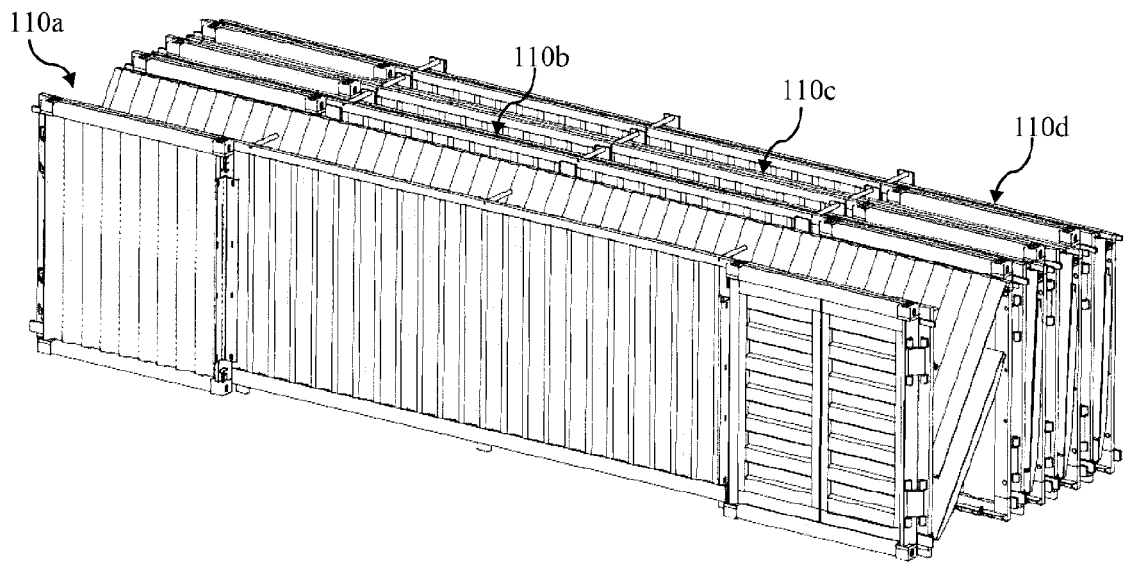
FIG. 28 is a perspective view of the collapsible intermodal containers of FIG. 26, as one of the collapsible intermodal containers is configuring from the erected configuration to the collapsed configuration with door assemblies in the open positions and the remaining collapsible intermodal containers are in the collapsed configurations with door assemblies in the open positions.

In a fifth step, as best seen in FIGS. 30 to 33, the door assemblies 24, 26 of the container 110a are moved to the closed positions such that at least the front ends 12c, 14c of the containers 110a, 110b, 110c, 110d abut with the rigid frame of the front door assembly 24 of the container 110a and the rear ends 12d, 14d of the containers 110a, 110b, 110c, 110d abut with the rigid frame of the rear door assembly 26 of the container 110a. It will be appreciated that the door assemblies 24, 26 of the container 110a in the closed positions will substantially limit forward and rearward movement of the containers 110a, 110b, 110c, 110. Further, as best seen in FIGS. 28 and 29, the openings defined by the corner brackets of the door assemblies 24, 26 of the container 110a receive the corner plates 14g of the container 110a and the corner plates 12i of the container 110d such that the corner plates 14g of the container 110a and the corner plates 12i of the container 110d abut with respective adjacent corner castings 25 of the door assemblies 24, 26 of the container 110a. This secures the left wall 14 of the container 110a with respect to the right wall 12 of the container 110d. Furthermore, the openings of the flap members of the door assemblies 24, 26 of the container 110a receive the protrusions 12g of the container 110d for removable attachment such that the door assemblies 24, 26 of the container 110a are locked in the closed positions. As best seen in FIGS. 32 and 33, the corner plates 12i of the container 110a and the corner plates 14g of the container 110d abut with the upper and lower members of the rigid frames of the door assemblies 24, 26 such that the right wall 12 of the container 110a and the left wall 14 of the container 110d are located between the door assemblies 24, 26 of the container 110a and limited in relative vertical movement. Also, the corner plates 12i, 14g of the containers 110b, 110c abut with the upper and lower members of the rigid frames of the door assemblies 24, 26 of the container 110a such that the containers 110b, 110c are located between the door assemblies 24, 26 of the container 110a and limited in relative vertical movement.

The above five steps form the collapsible intermodal container assembly 100 as best seen in FIG. 31. It will be appreciated that all components of the containers 110b, 110c, 110d and the walls 12, 14, 16, 18 of the container 110a are substantially supported by the rigid frames of the door assemblies 24, 26 of the container 110a. In the depicted embodiment, the assembly 100 has the same periphery as the container 10 in the erected configuration and the structural strength of the assembly 100 meets the requirements outlined by ISO in relation to a standardised intermodal container. Also, it will be appreciated that left wall 14 of the container 110a and the right wall 12 of the container 110d are spaced apart by an assembled distance which is the same as the first normal distance D1 of the container 10 described above.

According to the depicted embodiment, the assembly 100 meets the specifications required by ISO, specifically ISO 1496-1:2013—Series 1 Freight Containers, and therefore can be readily used with existing transportation infrastructure. Further, the assembly 100 allows up to four empty containers 110a, 110b, 110c, 110d to be transported in the same periphery as a single container.

Although the invention has been described with reference to preferred embodiments, it will be appreciated by a person skilled in the art that the invention may be embodied in many other forms and that a variety of alternative and/or equivalent implementations exist. It should be appreciated that the exemplary embodiments are examples only and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

It will also be appreciated that in this document the terms "comprise", "comprising", "include", "including", "contain", "containing", "have", "having", and any variations thereof, are intended to be understood in an inclusive (i.e. non-exclusive) sense, such that any process, method, device, apparatus or system described herein is not limited to those features or parts or elements or steps recited but may include other elements, features, parts or steps not expressly listed or inherent to such process, method, article, or apparatus. Furthermore, the terms "a" and "an" used herein are intended to be understood as meaning one or more unless explicitly stated otherwise. Moreover, the terms "first", "second", "third", etc. are used merely as labels, and are not intended to impose numerical requirements on or to establish a certain ranking of importance of their objects. In addition, it will be noted that terms such as "upper", "lower", "horizontal", and "horizontally" as used herein are to be understood with respect to the normal or in-use orientation of the invention and are to be interpreted in that context.

The invention claimed is:

1. A collapsible intermodal container, comprising:
   first and second opposing parallel side walls, and an upper wall and a lower wall, the first side wall being connected to the second side wall such that the collapsible intermodal container is configurable between an erected configuration in which the upper wall extends from an upper end portion of the first side wall to an upper end portion of the second side wall, and the lower wall extends from a lower end portion of the second side wall to a lower end portion of the first side wall, such that the first and second side walls are spaced apart by a first distance to define an interior for storing goods, and a collapsed configuration in which the upper wall extends downwardly from the upper end portion of the first side wall to the lower end portion of the first side wall, and the lower wall extends upwardly from the lower end portion of the second side wall to the upper end portion of the second side wall, such that the first and second side walls are spaced apart by a second distance which is less than the first distance; and
   front and rear end assemblies for closing front and rear ends of the container in the erected configuration and for controlling access to the interior, each of the front and rear end assemblies being hingedly attached to the first side wall,
   wherein, when the collapsible intermodal container is in the erected configuration, the front and rear end assemblies are engageable with the second side wall to secure the first side wall with respect to the second side wall, and, when the collapsible intermodal container is in the collapsed configuration, the front and rear end assemblies are engageable with at least a further collapsible intermodal container to secure the first side wall with respect to the further collapsible intermodal container.

2. The collapsible intermodal container according to claim 1, wherein, when the collapsible intermodal container is in the collapsed configuration, the front and rear end assemblies are further engageable with the second side wall to locate the second side wall between the front and rear end assemblies.

3. The collapsible intermodal container according to claim 1, wherein each of the front and rear end assemblies is pivotable between:
   a closed position in which the respective end assembly extends substantially perpendicularly from the first side wall, and
   an open position in which the respective end assembly extends substantially parallel and adjacent to the first side wall.

4. The collapsible intermodal container according to claim 3, wherein the front and rear end assemblies are pivoted to the closed positions to engage with the first and second side walls.

5. The collapsible intermodal container according to claim 1, further comprising one or more lifting systems for use in configuring the container to the erected configuration, each lifting system comprising an elongate line or tension member for use in lifting the upper wall when configuring the container to the erected configuration.

6. The collapsible intermodal container according to claim 5, wherein each lifting system further comprises a roller mechanism for supporting travel of the flexible line or tension member as it is pulled or drawn, and a hold member and a hold member for an operator to hold and drawn the elongate line or tension member; wherein one end region of the elongate line or tension member is fastened or secured to a free edge region of the upper wall, from which the elongate line or tension member extends to pass through or over the roller mechanism to an outer side of the other side wall, and wherein the hold member is secured to an opposite end region of the elongate line or tension member for an operator to hold and drawn the elongate line or tension member through or over the roller mechanism to lift the free edge region of the upper wall as the container is configured to the erected configuration.

7. The collapsible intermodal container according to claim 6, wherein each lifting system includes a track or rail attached to the outer side of the side wall for guiding movement of the hold member as the collapsible intermodal container is configured to the erected configuration.

8. The collapsible intermodal container according to claim 5, comprising a plurality of the lifting systems arranged spaced apart along a length of the side wall.

9. The collapsible intermodal container according to claim 5, wherein each lifting system includes a bracket attached to the outer side of the side wall at or near the lower end of the side wall to which the hold member is fixed or secured when the intermodal container is in the erected configuration.

10. A collapsible intermodal container assembly, comprising:
first and second collapsible intermodal containers according to claim 1, each of the first and second collapsible intermodal containers being in the collapsed configuration,
wherein the front and rear end assemblies of the first collapsible intermodal container are engaged with the first side wall of the first collapsible intermodal container and the second side wall of the second collapsible intermodal container such that the first side wall of the first collapsible intermodal container is secured to the second side wall of the second collapsible intermodal container.

11. The collapsible intermodal container according to claim 10, wherein the front and rear end assemblies of the first collapsible intermodal container extend substantially perpendicularly from the first side wall of the first collapsible intermodal container to the second side wall of the second collapsible intermodal container, and wherein the front and rear end assemblies of the second collapsible intermodal container extend substantially parallel and adjacent to the first side wall of the second collapsible intermodal container and are located between the front and rear end assemblies of the first collapsible intermodal container.

12. The collapsible intermodal container assembly according to claim 10, wherein the front and rear end assemblies are further engaged with the second side wall of the first collapsible intermodal container and the first side wall of the second collapsible intermodal container such that the second side wall of the first collapsible intermodal container and the first side wall of the second collapsible intermodal container are located between the front and rear end assemblies of the first collapsible intermodal container.

13. The collapsible intermodal container assembly according to claim 10, further comprising third and fourth collapsible intermodal containers,
wherein each of the third and fourth collapsible intermodal containers are in the collapsed configuration,
wherein each of the front and rear end assemblies of the third collapsible intermodal container extends substantially parallel and adjacent to the first side wall of the third collapsible intermodal container and each of the front and rear end assemblies of the fourth collapsible intermodal container extends substantially parallel and adjacent to the first side wall of the fourth collapsible intermodal, and
wherein the front and rear end assemblies of the first collapsible container are further engaged with the third and fourth collapsible intermodal containers such that the third and fourth collapsible intermodal container are located between the front and rear end assemblies of the first collapsible intermodal container and substantially supported thereby.

14. The collapsible intermodal container assembly according to claim 13, wherein the first, second, third and fourth collapsible intermodal containers are in a sidewardly stacked formation such that the second side wall of the first collapsible intermodal container abuts with the front and rear end assemblies of the third collapsible intermodal container, the second side wall of the third collapsible intermodal container abuts with the front and rear end assemblies of the fourth collapsible intermodal container, and the second side wall of the fourth collapsible intermodal container abuts with the front and rear end assemblies of the second collapsible intermodal container.

15. The collapsible intermodal container assembly according to claim 10, wherein an assembled distance between the first side wall of the first collapsible intermodal container and the second side wall of the second collapsible intermodal container is substantially equal to the first distance of the first intermodal container.

16. A collapsible intermodal container, comprising:
first and second opposing parallel side walls, the first side wall being connected to the second side wall such that the collapsible intermodal container is configurable between an erected configuration in which the first and second side walls are spaced apart by a first distance to define an interior for storing goods, and a collapsed configuration in which the first and second side walls are spaced apart by a second distance which is less than the first distance;
front and rear end assemblies for closing front and rear ends of the container in the erected configuration and for controlling access to the interior, each of the front and rear end assemblies being hingedly attached to the first side wall;
wherein, when the collapsible intermodal container is in the erected configuration, the front and rear end assemblies are engageable with the second side wall to secure the first side wall with respect to the second side wall, and, when the collapsible intermodal container is in the collapsed configuration, the front and rear end assemblies are engageable with at least a further collapsible intermodal container to secure the first side wall with respect to the further collapsible intermodal container; and
wherein each of the first and second side walls comprises: upper and lower forwardly extending members; and upper and lower rearwardly extending members, wherein the upper and lower forwardly extending members of the first and second side walls are adapted to engage with the front end assembly and the upper and lower rearwardly extending members of the first and second side walls are adapted to engage with the rear end assembly such that the first and second side walls are substantially supported by the front and rear end assemblies.

17. The collapsible intermodal container according to claim 16, wherein each of the front and rear end assemblies comprises a peripheral rigid frame comprising:
first and second side uprights, each of the first and second side uprights having upper and lower ends;
four corner parts respectively mounted to the ends of the first and second side uprights; and
upper and lower cross bars, the upper cross bar extending from the corner part mounted to the upper end of the first side upright to the corner part mounted to the upper end of the second side upright, and the lower cross bar extending from the corner part mounted to the lower end of the first side upright to the corner part mounted to the lower end of the second side upright.

18. The collapsible intermodal container according to claim 17, wherein, when the upper and lower forwardly extending members of the first and second side walls are engaged with the front end assembly, each of the upper forwardly extending members abuts with one of the corner parts mounted to the upper ends of the first and second side uprights of the front end assembly or the upper cross bar of the front end assembly and each of the lower forwardly extending member abuts with one of the corner parts mounted to the lower ends of the first and second side uprights of the front end assembly or the lower cross bar of the front end assembly.

19. The collapsible intermodal container according to claim 17, wherein, when the upper and lower rearwardly extending members of the first and second side walls are engaged with the rear end assembly, each of the upper rearwardly extending members abuts with one of the corner parts mounted to the upper ends of the first and second side uprights of the rear end assembly or the upper cross bar of the rear end assembly and each of the lower rearwardly extending member abuts with one of the corner parts mounted to the lower ends of the first and second side uprights of the rear end assembly or the lower cross bar of the rear end assembly.

20. The collapsible intermodal container according to claim 17, wherein each of the front and rear end assemblies comprises a rigid flap hingedly attached to a respective second side upright and pivotable to attach to the second side wall.

21. The collapsible intermodal container according to claim 17, wherein each of the corner parts is a corner casting for twistlock and/or bridge clamp engagement.

* * * * *